(12) United States Patent
Imatani et al.

(10) Patent No.: US 8,800,248 B2
(45) Date of Patent: Aug. 12, 2014

(54) SYSTEM FOR ASEPTICALLY FILLING A CONTAINER WITH A BEVERAGE OR FOOD

(75) Inventors: Tsuneo Imatani, Kanagawa (JP);
Takeshi Iwashita, Kanagawa (JP);
Hiroyuki Hashimoto, Kanagawa (JP);
Hideto Monzen, Kanagawa (JP);
Hotaka Fukabori, Kanagawa (JP);
Hiroyuki Kondou, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 646 days.

(21) Appl. No.: 13/059,750

(22) PCT Filed: Aug. 19, 2009

(86) PCT No.: PCT/JP2009/064530
§ 371 (c)(1),
(2), (4) Date: Feb. 18, 2011

(87) PCT Pub. No.: WO2010/024165
PCT Pub. Date: Mar. 4, 2010

(65) Prior Publication Data
US 2011/0146202 A1    Jun. 23, 2011

(30) Foreign Application Priority Data

Aug. 28, 2008 (JP) ................. 2008-220165
Apr. 10, 2009 (JP) ................. 2009-095940

(51) Int. Cl.
| B65B 3/02 | (2006.01) |
|---|---|
| B65B 55/02 | (2006.01) |
| B67C 7/00 | (2006.01) |
| B29C 49/02 | (2006.01) |
| B29C 49/64 | (2006.01) |
| B29B 11/12 | (2006.01) |
| B67B 3/00 | (2006.01) |
| B29D 22/00 | (2006.01) |
| B67C 3/22 | (2006.01) |

(52) U.S. Cl.
CPC ............... *B65B 3/022* (2013.01); *B65B 55/027* (2013.01); *B67B 3/003* (2013.01); *B67C 7/00* (2013.01); *B67C 2003/227* (2013.01); *B29B 11/12* (2013.01); *B29B 2911/14326* (2013.01); *B29C 49/02* (2013.01); *B29C 49/64* (2013.01); *B29D 22/003* (2013.01)
USPC .................................. 53/167; 53/561; 53/281

(58) Field of Classification Search
CPC  B67C 2003/227; B67C 7/00; B67B 2201/10; B67B 3/003; B29C 49/64; B29C 49/02; B65B 2210/06; B65B 3/022; B65B 55/027; B65B 55/025; B29D 22/003; B29B 11/12; B29B 2911/14326
USPC ............ 53/426, 452, 471, 167, 558, 561, 281
See application file for complete search history.

(56) References Cited

U.S. PATENT DOCUMENTS

| 4,256,789 | A | * | 3/1981 | Suzuki et al. | 428/36.92 |
|---|---|---|---|---|---|
| 4,885,197 | A | * | 12/1989 | Strassheimer | 428/36.92 |
| 5,328,655 | A | * | 7/1994 | Fortin | 264/544 |
| 5,342,663 | A | * | 8/1994 | Yokobayashi | 428/35.7 |
| 8,020,717 | B2 | * | 9/2011 | Patel | 215/375 |
| 2004/0091651 | A1 | * | 5/2004 | Rule et al. | 428/35.7 |
| 2005/0260371 | A1 | * | 11/2005 | Shi et al. | 428/35.7 |
| 2005/0281969 | A1 | * | 12/2005 | Shi | 428/35.8 |
| 2006/0127615 | A1 | * | 6/2006 | Kikuchi et al. | 428/35.7 |
| 2007/0251945 | A1 | | 11/2007 | Etoh et al. | |
| 2008/0042325 | A1 | | 2/2008 | Imatani et al. | |
| 2008/0063886 | A1 | * | 3/2008 | Kitano et al. | 428/542.8 |
| 2008/0193787 | A1 | * | 8/2008 | Dierickx | 428/542.8 |
| 2008/0246193 | A1 | * | 10/2008 | Smits et al. | 264/532 |
| 2008/0284063 | A1 | * | 11/2008 | Richards et al. | 264/458 |

FOREIGN PATENT DOCUMENTS

| JO | 2007-283529 | 11/2007 | |
|---|---|---|---|
| JP | 10-167226 | 6/1998 | |
| JP | 2002210808 A | * 7/2002 | ............. B29C 49/02 |
| JP | 2002240134 A | * 8/2002 | ............. B29C 49/02 |
| JP | 2002301758 A | * 10/2002 | ............. B29C 49/02 |
| JP | 2003-103609 | 4/2003 | |
| JP | 2004-291621 | 10/2004 | |
| JP | 2005-119208 | 2/2005 | |
| JP | 2005-342904 | 12/2005 | |
| JP | 2006-290369 | 10/2006 | |
| JP | 2007-276493 | 10/2007 | |

OTHER PUBLICATIONS

JPO machine translation JP 2007-283529 A, retrieved from http://www.ipdl.inpit.go.jp/homepg_e.ipdl, Jul. 29, 2013, 9 pages.*
JPO machine translation JP 2007-276493 A, retrieved from http://www.ipdl.inpit.go.jp/homepg_e.ipdl, Jul. 29, 2013, 10 pages.*
JPO machine translation JP 10-167226 A, retrieved from http://www.ipdl.inpit.go.jp/homepg_e.ipdl, Jul. 29, 2013, 9 pages.*

* cited by examiner

*Primary Examiner* — Stephen F Gerrity
(74) *Attorney, Agent, or Firm* — Greenblum & Bernstein, P.L.C.

(57) ABSTRACT

[Problem] To realize a predetermined "aseptic level of the containers" without introducing a container sterilizing machine and to reduce the burden for adjusting the temperature of the preform.

[Means for Solution] A metal mold for molding, wherein a space width (t2) of at least the body portion in the space width for forming a thickness of from the body portion to the bottom portion of the preform is set to lie in a range of 1.18 to 2.11 times as great as a space width (t1) for forming a thickness of an upper end portion of the mouth portion of the preform. At the time of the compression molding, the preform is taken out in the state of a high temperature from a compression-molding machine 31 and is fed to a bottle-producing unit C while maintaining the state of a high temperature. Further, the inner surfaces of a clean box I in which the units are placed and the outer surfaces of the units are sterilized, and the interior of the clean box I maintains a positive-pressure state with the filtered clean air. The bottle-producing unit C and a filling/sealing unit D are neighboring and directly coupled to each other in the same clean box, and are partitioned by a WBZ 54.

12 Claims, 10 Drawing Sheets

Fig. 8
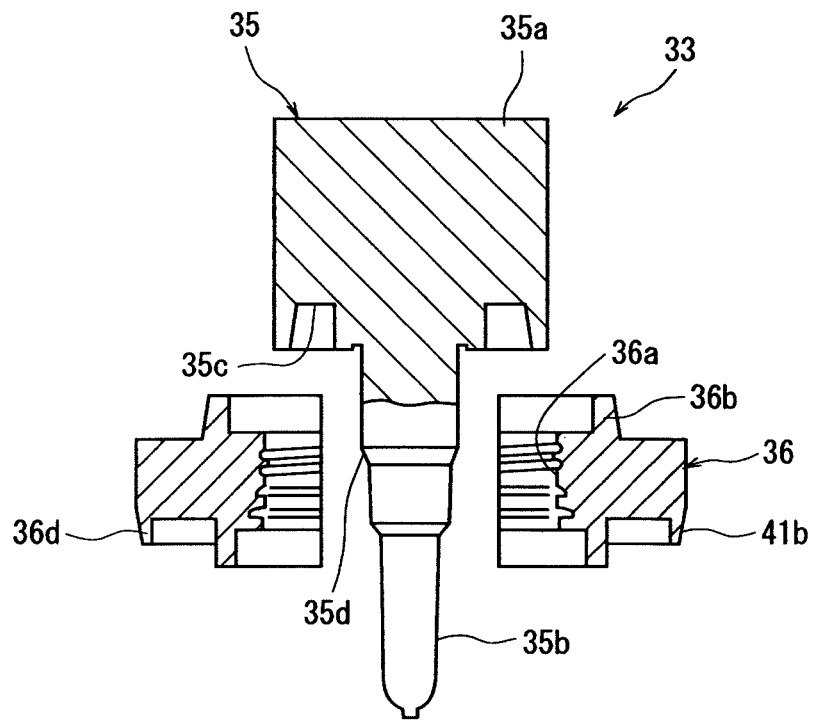
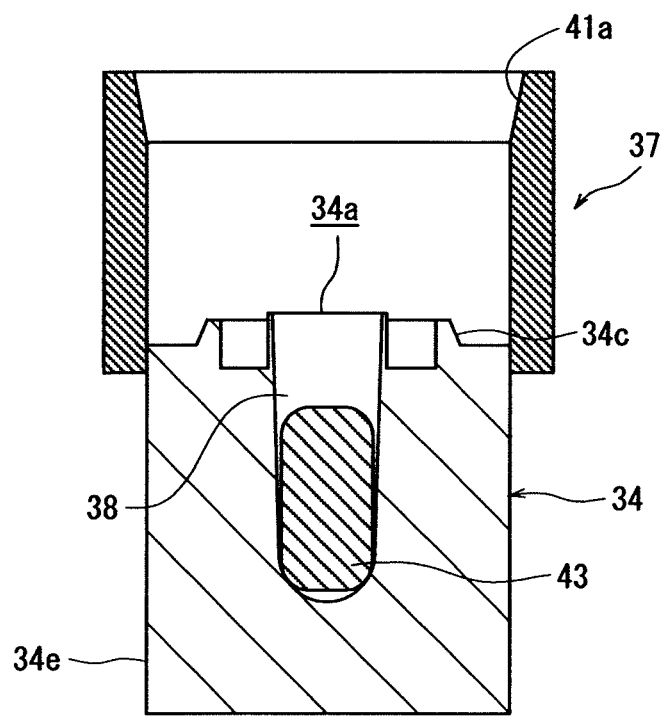

SYSTEM FOR ASEPTICALLY FILLING A CONTAINER WITH A BEVERAGE OR FOOD

TECHNICAL FIELD

This invention relates to a metal mold for compression-molding a preform under favorable conditions lowering the degree of re-heating or omitting the re-heating at the time of consecutively blow-molding the preforms, to a method of producing blow-molded containers, and to a system for aseptically filling the containers with beverages and foods and, particularly, to a system for aseptically filling foods realizing a predetermined "aseptic level of the containers" while omitting or simplifying a "container sterilizing machine".

BACKGROUND ART

Owing to their light weight, economy and excellent properties, the containers made from a synthetic resin have been widely used for everyday life for containing beverages and foods. In particular, the containers (PET bottles) made from a polyethylene terephthalate (PET) are very highly demanded as containers for containing soft drinks, fancy drinks and foods on account of their excellent mechanical properties and transparency, and have been importantly used by the consumes.

The synthetic resin containers as represented by the above polyethylene terephthalate are, usually, efficiently produced by a stretch-blow molding method (or often simply called stretch-molding or blow-molding) by inflation-molding a preform (cylindrically formed material with bottom formed in advance) in a metal mold by blowing a fluid such as the air therein.

The preforms have heretofore been molded by an injection-molding method. However, a compression-molding machine has now been proposed at a lower cost than the injection-molding machine, featuring a small size and being capable of conducting the molding at a low temperature. In order to increase mass-productivity and to improve production efficiency, a rotary compression-molding machine (rotary movable compression-molding machine) has been developed and employed having a number of metal molds mounted on a rotary disk.

In the case of the compression molding, the preforms of a synthetic resin are successively molded by a compression-molding machine, the molded preforms are readily and successively fed into a blow-molding machine by a conveyer line, and the preforms are successively molded into containers by the blow-molding machine (patent document 1). Therefore, the preforms molded by the compression-molding machine can be consecutively forwarded to the blow molding in a state of maintaining a high temperature without almost any fluctuation in the temperature of the individual preforms, which is favorable from the standpoint of not only molding the bottles maintaining stability but also maintaining asepsis of the filling system. The patent document 1 discloses a preferred temperature for taking out the preform without causing strain by conducting no external heat treatment such as of a gas burner or the hot air at the time of taking the preforms out of the metal molds of the compression-molding machine.

PRIOR ART DOCUMENTS

Patent Documents

Patent document 1: JP-A-2005-119208
Patent document 2: JP-A-2007-276493

OUTLINE OF THE INVENTION

Problems that the Invention is to Solve

The temperature at various portions of the preform right after molded by the compression-molding machine varies depending upon the thickness. In a system in which the preform-molding and the blow molding are directly coupled together, on the other hand, the temperature at the mouth portion is limited to be not higher than a predetermined temperature in order to avoid deformation due to stress exerted on the nozzle portion (mouth portion) at the time of taking the preform out of the core (male mold) after the preform is molded or at the time of high-pressure air sealing during the blow molding and to avoid the mouth portion from being deformed by the compressed air by itself. On the other hand, if the interior of the metal mold for compression molding is too cooled for an extended period of time in an attempt to lower the temperature of the mouth portion after the compression molding, the temperature also becomes low at the body portion and (or) at the bottom portion of the preform often making it difficult to effect the stretch molding to a sufficient degree at the time of readily conducting the stretch-blow molding while simplifying the step of heating the preform after the compression molding. Therefore, the blow molding requires the temperature adjustment such as partly heating a low-temperature portion of the preform, consuming a large amount of heat energy when the temperature is very low.

The present invention was accomplished in view of the above-mentioned circumstances, and has an object of providing a metal mold for compression-molding a preform which can reduce or omit the temperature adjustment by a heating device at the time of blow-molding the preform, and a method of producing blow-molded synthetic resin containers.

As described above, when the preform-molding machine is the injection-molding machine, a large quantity of preforms can be simultaneously molded generating, however, a blow-mold waiting time. Therefore, the temperature of the preforms fluctuates before the blow molding, and the temperature of some of them becomes lower than a sterilization-possible temperature. Therefore, it becomes necessary to sterilize the molded containers by arranging a container sterilizing machine on the downstream of the blow-molding machine. In general, further, the aseptic filling system must maintain "an aseptic level of the containers" of not higher than $10^{-6}$ [cfu/container]. For this purpose, the container sterilizing machine must have "a high sterilizing effect".

However, the sterilizing machine having "a high sterilizing effect" is very expensive arousing a problem of pushing up the cost of producing the aseptic filling system.

In view of the above problem inherent in the prior art, therefore, a second object of the present invention is to provide a system for aseptically filling the containers with beverages and foods realizing a predetermined "aseptic level of the containers" while omitting or simplifying a "container sterilizing machine".

Means for Solving the Problems

In order to achieve the above object, a first embodiment is concerned with a system for aseptically filling a container with a beverage or food, comprising a preform feed unit for molding a preform from a synthetic resin, a container-producing unit for molding a container from the preform, a filling/sealing unit for filling the container with a beverage or food and sealing the container with a seal member, and a seal member-sterilizing unit for sterilizing the seal member prior to the sealing; wherein the preform is maintained in a high-temperature state where a minimum temperature is not lower than 60° C. on the whole surface of the preform from when the preform is molded from the synthetic resin by the compression molding in the preform feed unit and is taken out from the metal mold for compression molding through up to just before it is molded into the container in the container-producing unit.

According to the system for aseptically filling the container with the beverage or food, the preform is molded by the compression molding in the preform feed unit. Therefore, the preforms after molded can all be taken out successively from the metal mold (compression-molding machine). As will be described later, further, while the preform that is taken out is being conveyed to the container-producing unit, heat that is held (in the central portion of the thickness) appears on the inner and outer surfaces due to the conduction of heat. As a result, the temperature on the inner and outer surfaces becomes higher than that of when taken out. That is, upon taking out the preform in the above high-temperature state from the metal mold, the preform can be placed in a so-called "heated sterilizing state". That is, the preforms that are produced can all be conveyed to the container-producing unit which is the next step while maintaining the "heated sterilizing state". As will be described later, therefore, when the container-producing unit is being sterilized and, besides, is placed in a highly aseptic environment, the containers molded from the preforms maintain a very high aseptic level making it possible to omit, from the aseptic filling system, the container sterilizing machine which has heretofore been installed downstream of the container-producing unit or to simplify the container sterilizing machine.

A second embodiment of the invention is concerned with the system for aseptically filling a container with a beverage or food of the first embodiment, wherein a female mold and a male mold of the metal mold for molding form a space for compression-molding a mouth portion, a body portion and a bottom portion of the preform, and a space width (t2) of at least the body portion in the space width for forming a thickness of from the body portion to the bottom portion of the preform is set to lie in a range of 1.18 to 2.11 times as great as a space width (t1) for forming a thickness of an upper end portion of the mouth portion of the preform.

A third embodiment of the invention is concerned with the system for aseptically filling a container with a beverage or food of the first or second embodiment, wherein a female mold and a male mold of the metal mold for molding form a space for compression-molding a mouth portion, a body portion and a bottom portion of the preform, and a space width (t2) of at least the body portion in the space width for forming a thickness of from the body portion to the bottom portion of the preform is set to lie in a range of 1.18 to 2.11 times as great as a space width (t3) for forming a thickness of from the lower side of a napiformed portion (annular rib portion) to the upper side of a neck ring portion of the mouth portion of the preform.

A fourth embodiment of the invention is concerned with the system for aseptically filling a container with a beverage or food of any one of the first to third embodiments, wherein the temperature on the surface of the preform of when it is taken out is controlled to stay in the high-temperature state by adjusting at least any one of "the preform-molding time of from when the metal mold for molding is closed until when it is opened", "the temperature at which the synthetic resin is thrown into the metal mold for molding" or "the temperature for cooling the metal mold for molding".

According to the system for aseptically filling a container with a beverage or food, one or a plurality of parameters are adjusted among the above parameters so that "the temperature for taking out the preform" can be set to a predetermined value. Therefore, the preform is capable of favorably maintaining the "heated sterilizing state" due to the heat held by itself until the preform is fed to the container-producing unit of the next step.

A fifth embodiment of the invention is concerned with the system for aseptically filling a container with a beverage or food of any one of the first to fourth embodiments, wherein the compression-molding machine for compression-molding the preform in the preform feed unit, container-producing unit, filling/sealing unit and seal member-sterilizing unit are installed in a clean box, and conveyer passages connecting the units are also installed in the clean box.

According to the system for aseptically filling a container with a beverage or food, the major portions and the sections among the major portions are installed in the clean box making it possible to provide beverages and foods filled in the containers maintaining a highly aseptic level by filling the containers that maintain a higher "heated sterilizing state" with beverages or foods maintaining a high aseptic level.

A sixth embodiment of the invention is concerned with the system for aseptically filling a container with a beverage or food of any one of the first to fifth embodiments, wherein the container-producing unit and the filling/sealing unit are directly coupled together and are installed in the same clean box.

According to the above system for aseptically filling a container with a beverage or food constituted as described above, the container maintaining the sterilized state can be filled with the sterilized beverage or food with no time lag.

A seventh embodiment of the invention is concerned with the system for aseptically filling a container with a beverage or food of the sixth embodiment, wherein the container-producing unit and the filling/sealing unit are partitioned from each other by a sterilized partitioning zone, preventing the beverage or food from infiltrating into the container-producing unit.

According to the above system for aseptically filling a container with a beverage or food constituted as described above, it is made possible to favorably prevent the beverage or food filled in the container from partly flying into the bottle-producing portion to deteriorate the "aseptic level of the containers".

An eighth embodiment of the invention is concerned with the system for aseptically filling a container with a beverage or food of any one of the fifth to seventh embodiments, wherein the interior of the clean box is controlled to maintain a cleanliness level of not lower than a class 10,000.

According to the above system for aseptically filling a container with a beverage or food, the interior of the clean box is controlled to maintain the above cleanliness level contributing to favorably improving the "aseptic level of the containers" in the system for aseptically filling the containers with the beverage or food in addition to placing the containers in the "heated sterilizing state".

A ninth embodiment of the invention is concerned with the system for aseptically filling a container with a beverage or food of any one of the fifth to eighth embodiments, wherein the inner surface of the clean box and the outer surfaces of the units installed in the clean box are sterilized.

According to the above system for aseptically filling a container with a beverage or food, the inner surface of the clean box and the outer surfaces of the units are sterilized contributing to favorably improving the "aseptic level of the containers" in the system for aseptically filling the containers with the beverage or food in addition to placing the containers in the "heated sterilizing state" and maintaining the above cleanliness.

A tenth embodiment of the invention is concerned with the system for aseptically filling a container with a beverage or food of any one of the fifth to ninth embodiments, wherein the interior of the clean box maintains a positive-pressure environment with the filtered clean air.

According to the above system for aseptically filling a container with a beverage or food, the interior of the clean box maintains a positive-pressure environment favorably preventing the infiltration of germs from the exterior, and contributing to favorably improving the "aseptic level of the containers" in the system for aseptically filling the containers with the beverage or food in addition to placing the containers in the "heated sterilizing state" and maintaining the above cleanliness and sterilization.

An eleventh embodiment of the invention is concerned with the system for aseptically filling a container with a beverage or food of any one of the first to tenth embodiments, wherein the synthetic resin is a polyethylene terephthalate, the container is a bottle molded from a compression-molded preform through a blow molding, the seal member is a screw-type cap, and the bottle filled with the heat-sterilized beverage is sealed by screwing the screw-type cap.

According to the above system for aseptically filling a container with a beverage or food, the polyethylene terephthalate having general and excellent applicability is used as a material of the container, the blow molding is employed that is adapted to molding the preform into a bottle-type container, and the heat-sterilized beverage filled in the bottle-type container is sealed by using the screw-type cap that excels in sealing and resealing performance. Thus, the system becomes adapted to the beverages filled in the PET bottles that are abundantly placed in the market.

In order to solve the above-mentioned problems, a twelfth embodiment of the invention is concerned with a metal mold for compression-molding a preform, including a female mold and a male mold for forming a space for compression-molding the preform that has a mouth portion, a body portion and a bottom portion for forming a blow-molded synthetic resin container, wherein a space width (t2) of at least the body portion in the space width for forming a thickness of from the body portion to the bottom portion of the preform is set to lie in a range of 1.18 to 2.11 times as great as a space width (t1) for forming a thickness of an upper end portion of the mouth portion of the preform.

In order to solve the above-mentioned problems, a thirteenth embodiment of the invention is concerned with a metal mold for compression-molding a preform, including a female mold and a male mold for forming a space for compression-molding the preform that has a mouth portion, a body portion and a bottom portion for forming a blow-molded synthetic resin container, wherein a space width (t2) of at least the body portion in the space width for forming a thickness of from the body portion to the bottom portion of the preform is set to lie in a range of 1.18 to 2.11 times as great as a space width (t3) for forming a thickness of from the lower side of a napiformed portion to the upper side of a neck ring portion of the mouth portion of the preform.

A fourteenth embodiment of the invention is concerned with a method of producing blow-molded synthetic resin containers, comprising:

a step of compression-molding the synthetic resin heated and melted at a temperature of higher than its melting temperature into a preform of a blow-molded container by using the metal mold for compression-molding the preform of the above twelfth or thirteenth embodiment;

a step of taking out from the metal mold for taking out the preform from the metal mold for compression molding after the compression molding has been finished and after the metal mold has cooled the preform; and a step of blow molding for molding a container by blow-molding the preform after the step of taking out from the metal mold.

A fifteenth embodiment of the invention is concerned with a preform for molding a blow-molded synthetic resin container right after compression-molded by the metal mold for compression-molding the preform of the above twelfth embodiment and taken out from the cooled metal mold, wherein a thickness (t2') of at least the body portion in the thickness of from the body portion to the bottom portion of the preform is set to lie in a range of 1.18 to 2.11 times as great as a thickness (t1') of an upper end portion of the mouth portion of the preform.

A sixteenth embodiment of the invention is concerned with a preform for molding a blow-molded synthetic resin container right after compression-molded by the metal mold for compression-molding the preform of the above thirteenth embodiment and taken out from the cooled metal mold, wherein a thickness (t2') of at least the body portion in the thickness of from the body portion to the bottom portion of the preform is set to lie in a range of 1.18 to 2.11 times as great as a thickness (t3') of from the lower side of a napiformed portion to the upper side of a neck ring portion of the mouth portion of the preform.

Effects of the Invention

According to the system for aseptically filling the containers with beverages and foods of the invention, the preforms can be molded from the molten resin by compression molding, can be taken out from the metal mold maintaining a high-temperature state and can be successively fed to the container-producing unit of the next step in the high-temperature state. That is, the preforms that are produced are all conveyed to the container-producing unit of the next step maintaining the "heated sterilizing state" owing to the heat held by themselves. Therefore, when the container-producing unit for molding the containers is sterilized and the environment (clean box) in which the container-producing unit is placed maintains a high aseptic level, e.g., when the interior of the clean box is sterilized and maintains a positive pressure (relative to the general environment) with the filtered clean air, the "aseptic level of the containers" is strikingly improved. As a result, it is allowed to omit, from the aseptic filling system, the container sterilizing machine which has heretofore been installed downstream of the container-producing unit or to simplify the container sterilizing machine.

According to the system for aseptically filling the containers with beverages and foods of the invention, further, the container-producing unit and the filling/sealing unit are placed neighboring each other and are directly coupled together making it possible to fill the containers maintained in the sterilized state and having a high "aseptic level" with the sterilized beverage or food through an aseptic filling line with no time lag, and to seal the containers.

Upon placing the container-producing unit and the filling/sealing unit neighboring each other and upon directly coupling them together, the beverage or the food may partly fly into the container-producing unit posing a probability of propagation of germs therein. Upon providing a partitioning wall zone (WBZ: wet blocking zone) between the container-producing unit and the filling/sealing unit, however, the "aseptic level of the containers" is prevented from being deteriorated by the beverage or the food. Therefore, the system for aseptically filling the containers with beverages and foods of the invention is capable of producing the containers having a high aseptic level and producing container-packed beverages and foods maintaining a high aseptic level.

According to the invention, the metal mold for compression-molding the preforms, the method of producing the blow-molded synthetic resin containers and the preform are such that the metal mold for compression-molding the preforms includes a female mold and a male mold for forming a space for compression-molding the preform that has a mouth portion, a body portion and a bottom portion for forming the blow-molded synthetic resin container, wherein a space width (t2) of at least the body portion thickness (t2') in the space width for forming a thickness of from the body portion to the bottom portion of the preform is set to lie in a range of 1.18 to 2.11 times as great as a space width (t1) for forming a thickness (t1') of an upper end portion of the mouth portion of the preform. Therefore, the preform compression-molded by using the metal mold is cooled together with the metal mold and is taken out therefrom, and is easily placed in a state where the upper end of the mouth portion is favorably cooled while the body portion maintains a sufficiently high temperature. Accordingly, the upper end of the mouth portion of the preform is prevented from being deformed by heat while the heat treatment is effected to a decreased degree or is not effected for the body portion during the blow molding.

According to the eleventh embodiment of the invention, the metal mold for compression-molding the preforms, the method of producing the blow-molded synthetic resin containers and the preform are such that the metal mold for compression-molding the preforms includes a female mold and a male mold for forming a space for compression-molding the preform that has a mouth portion, a body portion and a bottom portion for forming the blow-molded synthetic resin container, wherein a space width (t2) of at least the body portion thickness (t2') in the space width for forming a thickness of from the body portion to the bottom portion of the preform is set to lie in a range of 1.18 to 2.11 times as great as a space width (t3) for forming a thickness (t3') of from the lower side of a napiformed portion to the upper side of a neck ring portion of the mouth portion of the preform. Therefore, the preform compression-molded by using the metal mold is cooled together with the metal mold and is taken out therefrom, and is easily placed in a state where the lower side of the napiformed portion to the upper side of the neck ring portion of the mouth portion is favorably cooled while the body portion maintains a sufficiently high temperature. Accordingly, the lower side of the napiformed portion to the upper side of the neck ring portion of the mouth portion is prevented from being deformed by heat while the heat treatment is effected to a decreased degree or is not effected for the body portion during the blow molding.

BRIEF DESCRIPTION OF THE DRAWINGS

[FIG. 8] is a sectional view of an initial position of the preform in the metal mold for compression molding in the compression-molding machine shown in FIG. 6.

BEST MODE FOR CARRYING OUT THE INVENTION

Figure 1:
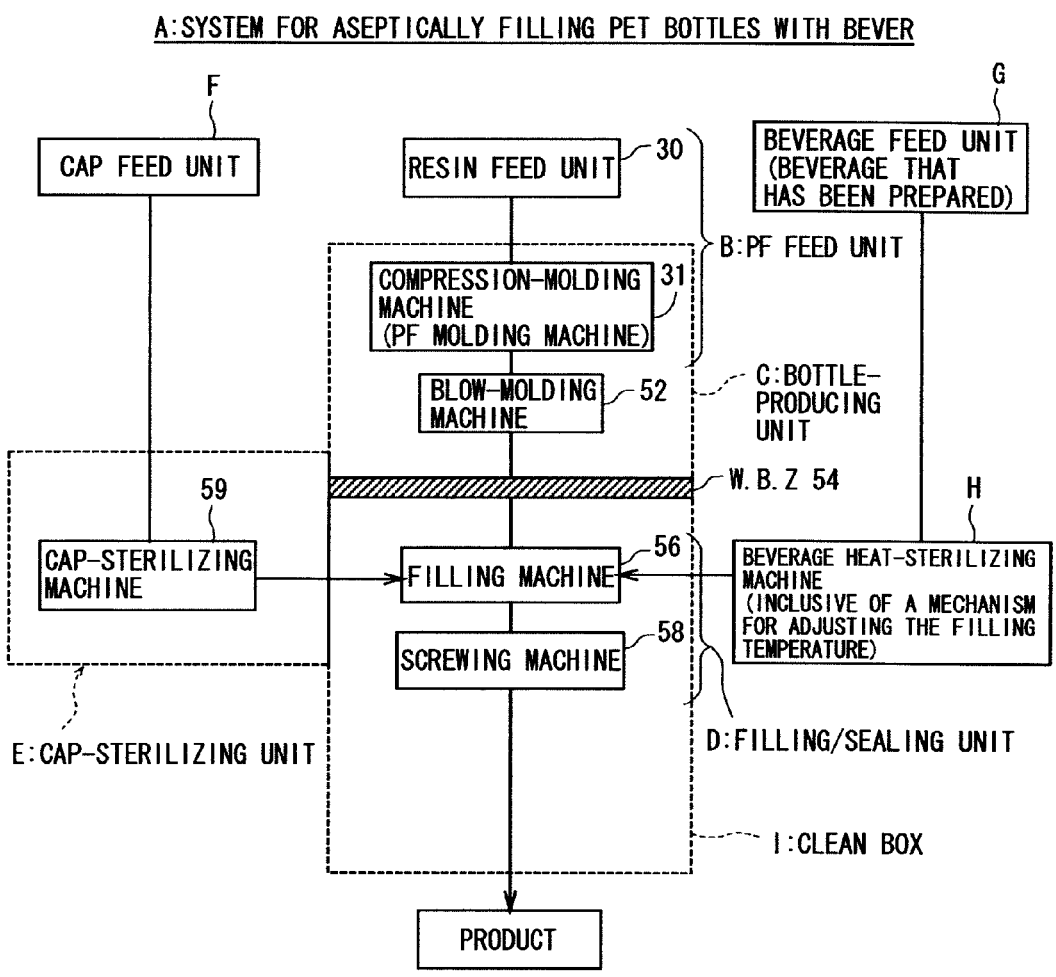
[FIG. 1] is a diagram illustrating the constitution of a system for aseptically filling PET bottles with a beverage, equipped with a metal mold for compression-molding a preform according to a first embodiment of the present invention (the same holds for the second embodiment).

The invention will be described in further detail by way of the embodiments shown in the drawings.

FIG. 1 is a diagram illustrating the constitution of a system A for aseptically filling PET bottles with a beverage, which is a system for aseptically filling the containers with beverage and food of the invention.

The system A for aseptically filling PET bottles with beverage includes a preform (hereinafter often abbreviated as PF) feed unit B which molds a preform from a polyethylene terephthalate (PET resin) which is a synthetic resin and feeds it to a bottle-producing unit C which is a container-producing unit, the bottle-producing unit C which produces a PET bottle which is the main body of a container from the preform through a biaxial stretch blow, a filling/sealing unit D for filling the PET bottle with a beverage out of beverage and food, and sealing the PET bottle with "cap that has been sterilized" which is a sterilized seal member, a cap-sterilizing unit E for sterilizing the cap that is the seal member of the container and for feeding it to the filling machine, a cap feed unit F for feeding the cap, a beverage feed unit G for feeding the beverage that has been prepared, and a beverage heat-sterilizing machine H for heating and sterilizing the prepared beverage. A dotted line represents a clean box.

Further, as will be described later in detail, the system A for aseptically filling the PET bottle with the beverage uses a compression-molding machine 31 as a PF-molding machine. Therefore, the produced preforms can all be successively taken out in a high-temperature state. Accordingly, the preforms maintain the "heated sterilizing state" due to the heat held by themselves until just before conveyed to the bottle-producing unit C and molded into the PET bottles, and can thus be molded into the PET bottles each maintaining nearly an equal thermal hysteresis.

The inner surface of the clean box I and the outer surfaces of the units (compression-molding machine 31, blow-molding machine 52, filling machine 56, screwing machine 58) are sterilized with a chemical liquid. Further, the interior of the clean box I maintains a positive-pressure environment with the filtered clean air contributing to greatly improving the aseptic level of the produced PET bottles in addition to placing the preforms in the "heated sterilizing state". Here, it is desired that the interior of the clean box I is so controlled as to maintain a cleanliness level of not lower than class 10,000. This makes it possible to omit, from the filling system, the bottle sterilizing machine that has heretofore been arranged downstream of the bottle-producing unit C or to simplify the bottle sterilizing machine.

The PF feed unit B includes a resin feed unit 30 for feeding a molten resin mass (hereinafter often called drop) that is the material of the preform, and a compression-molding machine 31 for molding the preform from the molten resin mass. The compression-molding machine 31 is a rotary compression-molding machine having a plurality of metal molds for molding along the circumference thereof. As described above, further, the outer surfaces of the compression-molding machine 31 have been sterilized with a chemical agent or heat-sterilized with aseptic water of a high temperature.

The sterilization treatment with a chemical agent may be to conduct the sterilization with, for example, peracetic acid type chemical agent, hydrogen peroxide, ozone type chemical agent, or chlorine type germicide containing hypochlorous acid followed by washing with aseptic water, or to conduct the sterilization with an alcohol or, preferably, 60 to 95% ethanol (followed, as required, by washing with aseptic water). After the sterilization treatment with the chemical agent or after the heat-sterilization treatment with aseptic water of a high temperature, it is desired to conduct drying with the filtered clean air. Or, a dry sterilization treatment may be conducted by using a hydrogen peroxide gas.

The above treatments may be suitably combined together by taking the frequency of sterilization treatment and the degree of contamination by germs into consideration. As required, the sterilization and washing treatments may be effected for the surfaces of the products (outer surface of the core metal mold, inner surface of the cavity metal mold, inner surface of the slide insert metal mold 36) for molding the preform of the metal mold that will be described later of the compression-molding machine 31.

The bottle-producing unit C includes a blow-molding machine 52 which consecutively molds the preforms in the "heated sterilizing state" consecutively conveyed from the PF feed unit B (compression-molding machine 31) into the PET bottles through the biaxial stretch blow. As described above, further, the outer surface of the blow-molding machine 52 has been sterilized with a chemical agent and washed with aseptic water, or heat-sterilized with aseptic water of a high temperature, or has been sterilized by both of them and, preferably, has, further, been dried with the filtered clean air, or has been dry-sterilized with a hydrogen peroxide gas. As required, further, the sterilization and washing treatments may be effected for the surfaces of the products (inner surface of the metal mold) for molding the container of the metal mold for blow molding in the blow-molding machine 52.

It is desired that the metal mold for blow molding in the blow-molding machine 52 is maintained at a temperature not lower than 60° C., preferably, at a temperature higher than a glass transition temperature of the polyethylene terephthalate and, more preferably, at a temperature higher than the glass transition temperature of the polyethylene terephthalate+40° C. so that the blow-molded PET bottle can be heat-set without being contracted by heat and, further, that the PET bottle is conveyed to the filling machine 56 maintaining a high temperature and a high aseptic level. Further, the air to be blown is the filtered clean air having an elevated pressure and, more preferably, the filtered clean air that is heated at not lower than 60° C. and having an elevated pressure.

The filling/sealing unit D includes a filling machine 56 for filling the PET bottle with a predetermined amount of beverage that has been heat-sterilized with aseptic water of a high temperature through a filling line (liquid feed line), and a screwing machine 58 for sealing the PET bottle in which the beverage has been filled with a "sterilized screw-type cap" fed from the cap-sterilizing unit E.

The bottle-producing unit C and the filling/sealing unit D are directly coupled together via a conveyer apparatus (conveyer passage) without providing storage apparatus for storing a large quantity of bottles in order to decrease the probability of contamination by germs. Further, a WBZ (wet blocking zone) 54 is provided as a sterilized partitioning wall between them. The WBZ 54 prevents the beverage from partly flying into the bottle-producing unit C and prevents the aseptic level of the molded PET bottles from being deteriorated. The WBZ 54 may be simply a sterilized wall which does not permit the passage of liquid, gas or solid, or may be a fine mesh-like body which is permeable to gas but fine enough to prevent the passage of liquid that may be scattered from the filling machine 56. It is, further, desired that the WBZ is made of a clear glass or a clear plastic material enabling the bottle-producing unit C and the filling/sealing unit D to see each other. Desirably, further, the WBZ is applied or blended with an antibacterial agent or is treated with the antibacterial agent. When the WBZ 54 is the wall or the mesh-like body as described above, a passage portion for conveying the bottles is suitably maintained opened.

Further, the WBZ 54 may be simply a sterilized space having a distance large enough for the liquid that may fly from the filling/sealing unit D not to reach the blow-molding machine 52. Here, if the distance is so suppressed that the blow-molded PET bottles are not cooled down below a sterilization-possible temperature while being conveyed from the blow-molding machine 52 to the filling machine 56, it can be expected that the PET bottles are conveyed to the filling machine 56 maintaining a high aseptic level.

Or, the WBZ 54 may be an air curtain provided in the sterilized space by using the filtered clean air, and the stream of the air or, preferably, the stream of the filtered clean air may be so generated that the liquid that may be scattered is directed toward a direction away from the blow-molding machine 52. In this case, it is desired to provide a replaceable liquid recovery tray at a place to where the air flows and to readily replace the tray after it is confirmed that the liquid is deposited thereon.

Further, the WBZ 54 may be a suitable combination of the above-mentioned ones.

The cap-sterilizing unit E comprises a cap-sterilizing machine 59 which sterilizes the screw-type cap fed from the cap feed unit F. The cap-sterilizing machine 59 is, for example, an EB (electron beam) irradiation machine, a UV (ultraviolet ray) irradiation machine or a peracetic acid rinser. When the cap-sterilizing machine 59 is of the type of injecting a chemical agent, such as the peracetic acid rinser, a cap-washing machine must be separately provided for washing away the chemical agent adhered to the cap with the aseptic water. Here, it is further desired if there is provided an apparatus for drying the cap with the filtered clean air.

The clean box I is one of the means for purifying the environment in which the machines are installed by shielding the interior thereof from the general environment and introducing the clean air into the interior thereof to maintain the interior clean and under a positive pressure. The clean air is produced by passing the air from the general environment through a HEPA filter or an ULPA filter. The interior is sterilized and washed at regular intervals and, therefore, is reset to the initial aseptic level at regular intervals. The resetting method may be the one of the type of injecting a chemical agent, the one of the type of injecting a chemical gas or the one which effects the cleaning with an alcohol. The chemical agent that is used may be a peracetic acid aqueous solution, a hydrogen peroxide aqueous solution or an ozone aqueous solution. The aseptic water is used for the washing followed, desirably, by drying with the filtered clean air. Or, the dry-sterilization may be effected with a hydrogen peroxide gas.

The clean box may be suitably provided for each of the units and for each of the conveyer passages connecting the units. As shown in FIG. 1, however, it is desired to arrange the compression-molding machine 31, blow-molding machine 52, WBZ 54, filling machine 56 and screwing machine 58 all in one group in the clean box I from the standpoint of controlling and handling the clean box.

Here, the cap-sterilizing machine 59 may be arranged in the clean box I or in a separate clean box as shown in FIG. 1. Further, though not shown, the resin feed unit 30, too, may be arranged in an independent clean box or may be arranged in the clean box I together with a cutter wheel 8 that will be described later.

The cap feed unit F feeds the screw-type cap for sealing the beverage in the PET bottle to the cap-sterilizing unit E. The screw-type cap is, preferably, a plastic cap made from a polyolefin resin such as polypropylene or polyethylene, but may be a metal cap such as of aluminum.

Figure 2:
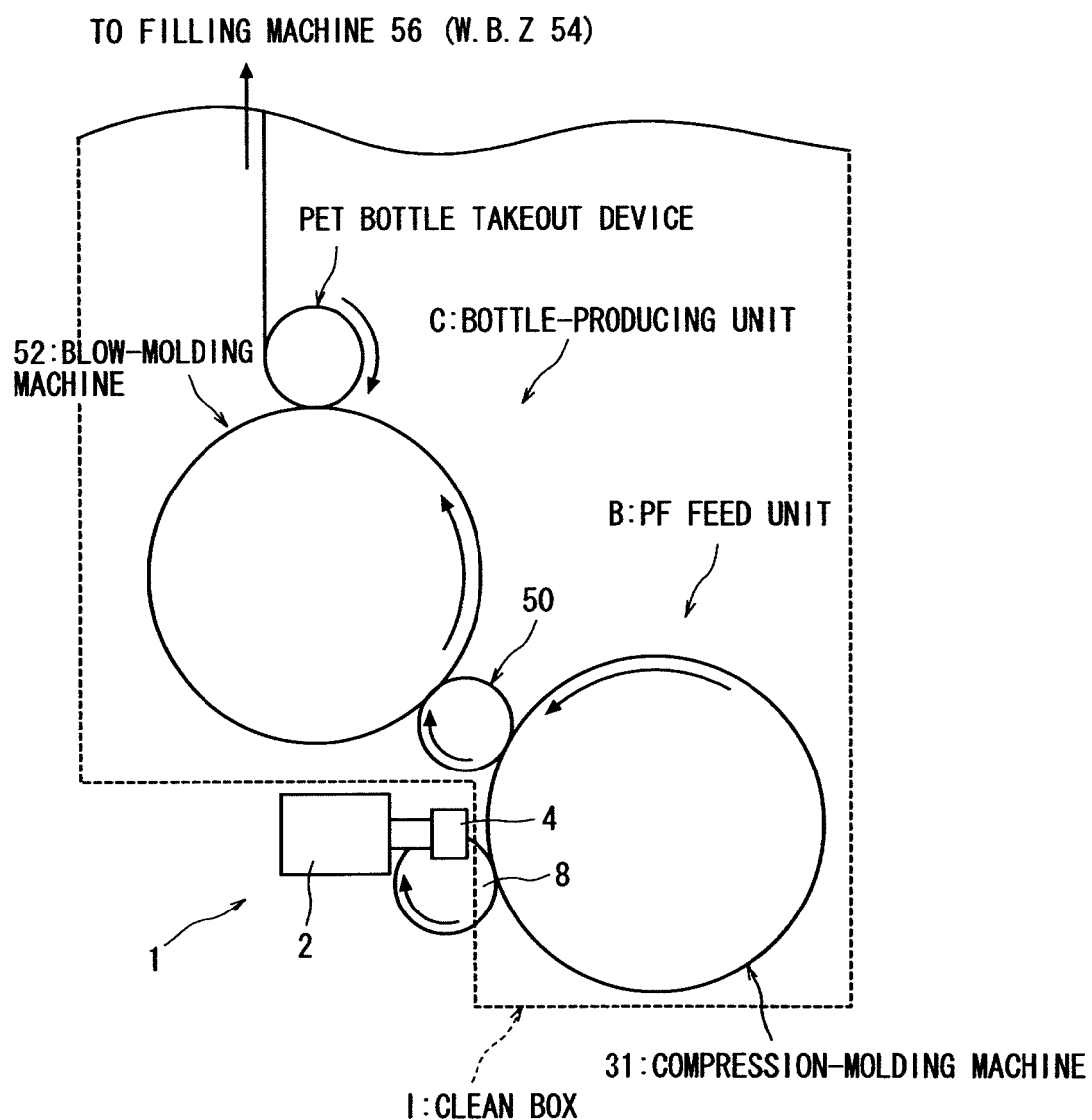
[FIG. 2] is a schematic plan view chiefly illustrating a bottle-producing unit in the system for aseptically filling PET bottles with a beverage of FIG. 1 (the same holds for the second embodiment).

FIG. 2 is a plan view showing the PF feed unit B and the bottle-producing unit C according to the present invention.

The resin feed unit 30 includes an extruder 2 and an extrusion nozzle 4. A cutter wheel 8 linking the resin feed unit 30 to the compression-molding machine 31 cuts the molten resin melted and kneaded by the extruder 2 and extruded at a constant speed from an opening of the extrusion nozzle 4 by using a cutting tool at a regular time interval to form a molten resin mass of a predetermined amount. The molten resin mass is held by a holding/conveying mechanism, and is conveyed (thrown) into a metal mold for molding (cavity metal mold 34) of the compression-molding machine 31 in the clean box I. Though not shown, the cutter wheel 8, too, may be arranged in an independent clean box or in the clean box I.

Figure 3:
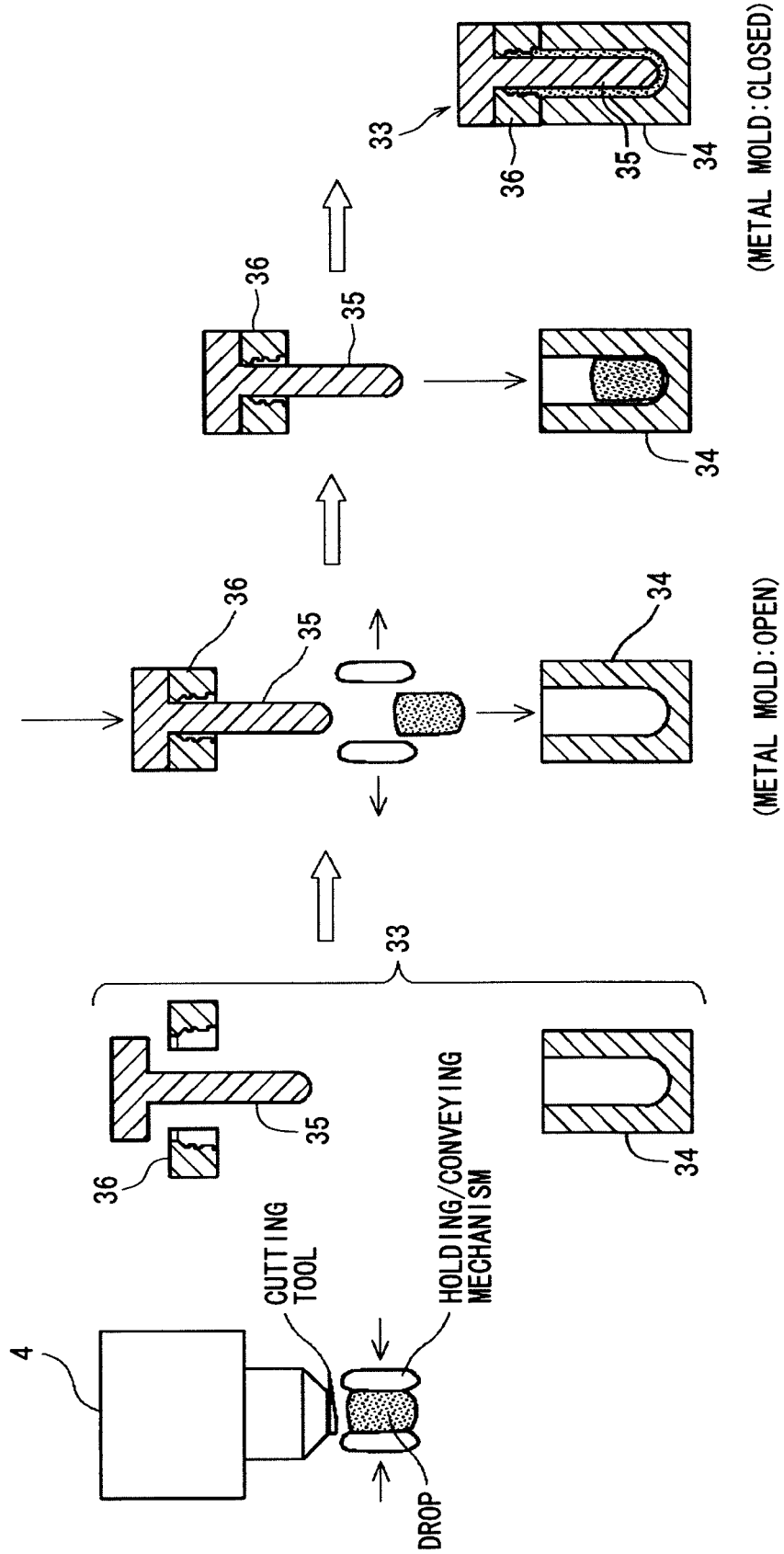
[FIG. 3] is a view illustrating a drop for molding a preform according to the first embodiment of the invention and a metal mold for molding.

The compression-molding machine 31 has many metal molds 33 for compression molding arranged along the circumference of a rotary disk. Referring to FIG. 3, the metal mold 33 for molding includes a core metal mold (male mold) 35, a slide insert metal mold (conventional type) 36 and a cavity metal mold (female mold) 34. The core metal mold 35, slide metal mold 36 and cavity metal mold 34 are moved relative to each other so as to be assembled and disassembled. After the core metal mold 35, slide insert metal mold 36 and cavity metal mold 34 are disassembled, the slide insert metal mold 36 can be, further, moved and split in the right-and-left direction.

The metal mold has, usually, such that the cavity metal mold 34 is fixed to the rotary disk and has a cavity for forming the outer shapes of the body portion and the bottom portion of the preform, the core metal mold 35 has a core for forming chiefly the inner shape of the preform (inner surfaces of from the mouth portion to the body portion and the bottom portion) and is allowed to move up and down due to a hydraulic mechanism, a servo mechanism or a cam mechanism, and the slide insert metal mold 36 forms the outer surface of the mouth portion of the preform (a portion corresponding to the outer surface of the mouth portion of the PET bottle). The slide insert metal mold 36 is provided with a spiral groove so as to form a thread on the outer surface of the mouth portion of the preform to meet the screw-type cap, and comprises a split mold so as to be removed from the preform that has been molded. The slide insert metal mold 36 can be moved up and down due to a hydraulic mechanism, a servo mechanism or a cam mechanism. After separated from the core metal mold 35 and the cavity metal mold 34, the slide insert metal mold 36 can be moved and split in the right-and-left direction by a pneumatic mechanism, a hydraulic mechanism, a servo mechanism or a cam mechanism so that the preform that is compression-molded can be taken out. The top portion (top panel) of the preform is formed by either the core metal mold 35 or the split mold, or by a combination thereof.

The molten resin mass (drop) conveyed by the cutter wheel 8 to the compression-molding machine 31 falls down into the cavity of the cavity metal mold 34 as it is released from the holder fitting of the holding/conveying mechanism on the upper part of the cavity metal mold 34. Next, the core metal mold 35 and the slide insert metal mold 36 move down to compress the drop. The compressed drop fills a space for forming the preform defined by the cavity metal mold 34, core metal mold 35 and slide insert metal mold 36. After compressed for a predetermined period of time, a preform is molded. After the metal mold is cooled, the core metal mold 35 and the slide insert metal mold 36 move up. Thereafter, the slide insert metal mold 36 moves and splits toward the right and left, whereby the preform is taken out from the metal mold for molding, received by the PF takeout device as it is removed from the metal mold for molding, and is fed to the blow-molding machine 52. Here, the preforms that are compression-molded by the metal mold 33 for compression molding are successively taken out and are thrown into the blow-molding machine. Therefore, if the molding speed of the blow-molding machine 52 is not lower than the molding speed of the metal mold 33 for compression molding, the compression-molded preforms can be readily subjected to the blow molding without any time waiting for the blow molding.

The metal mold 33 for compression molding will be described later in the second embodiment. Here, it is also allowed to use the same metal mold as the metal mold for compression molding shown in FIGS. 8 to 10 described in the second embodiment.

Figure 4:
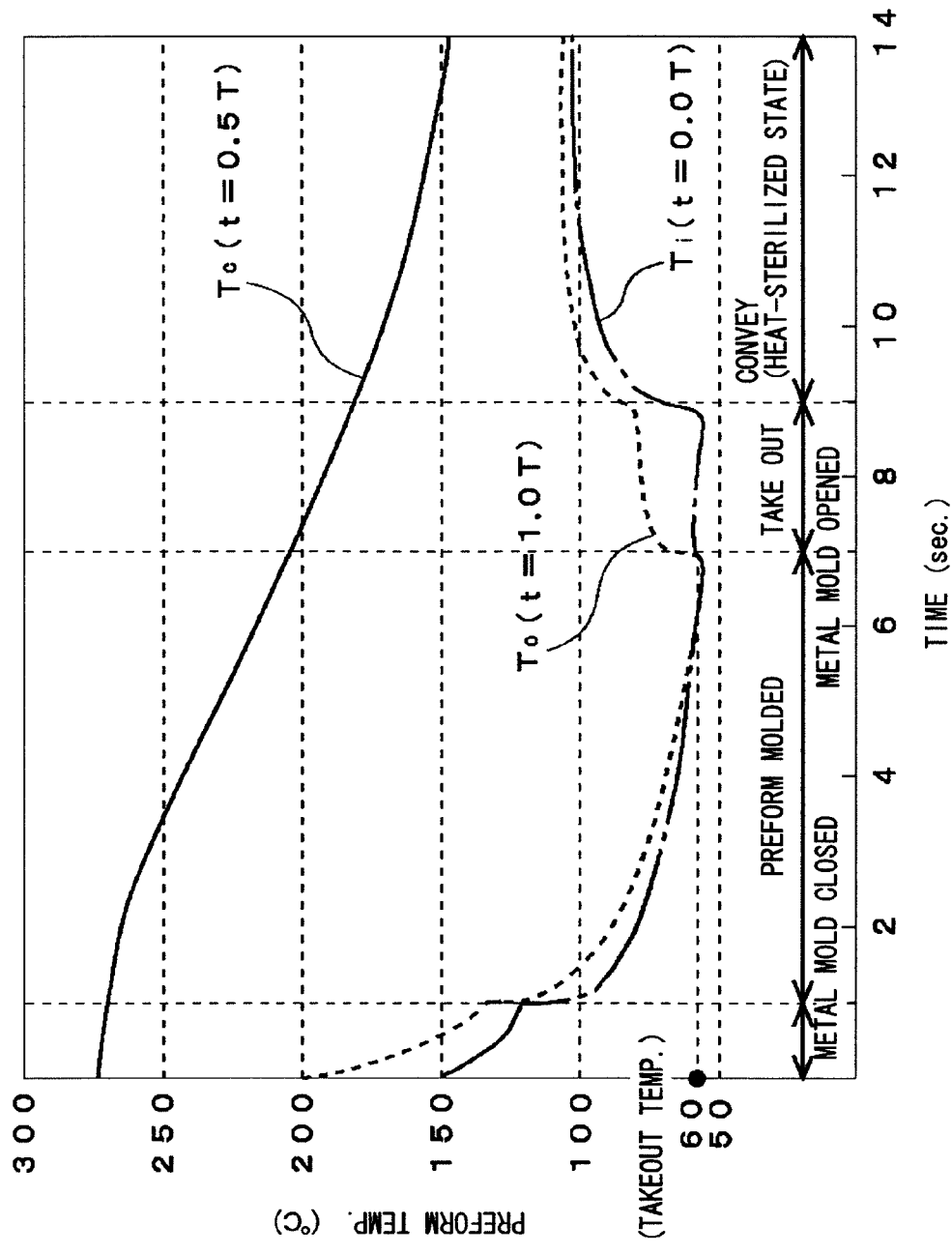
[FIG. 4] is a graph showing temperature characteristics of a preform in various phases from when the drop is thrown in until when it is conveyed.

FIG. 4 is a graph showing temperature characteristics of the preform in various phases of from when the drop is thrown in until when it is conveyed.

This graph is a simulation of the temperature characteristics in each of the phases of when the drop is thrown into the cavity metal mold 34, the core metal mold 35 and the slide insert metal mold 36 are moved down to compress the drop, the compressed drop fills the space for forming the preform defined by the cavity metal mold 34, core metal mold 35 and slide insert metal mold 36, and the preform is molded after compressed for a predetermined period of time and, thereafter, the preform taken out by the PF takeout device is conveyed to the blow-molding machine 52. The temperatures are measured at the center of the body portion of the preform in the direction of height (position corresponding to the center of the preform-molding surface of the cavity metal mold 34 in the direction of height) on the outer surface (t=1.0T) of the side wall of body portion of the preform having a thickness T=3.5 mm, on the inner surface thereof (t=0.0T) and at the center of the thickness (t=0.5T) which is the central position. The metal mold is cooled down to 12° C. while the ambient temperature is 25° C.

As will be learned from the graph, after the preform is taken out from the compression-molding machine 31 (metal mold for molding), heat held therein is conducted from the center of the thickness (t=0.5T) to the outer surface (t=1.0T) and to the inner surface (t=0.0T). Therefore, the temperatures $T_o$, $T_i$ rise on the outer surface (t=1.0T) and on the inner surface (t=0.0T) (conversely, the temperature $T_c$ drops at the center of the thickness).

For example, when the temperatures at the time when the drop is thrown in are $T_c$=275° C., $T_o$=200° C. and $T_i$=150° C. and the time for molding the preform (time from when the metal mold is closed until when it is opened) is 6 seconds (temperature of the preform of when it is taken out is about 60° C.), the temperature $T_o$ on the outer surface of the preform reaches a maximum of 106.4° C. and the temperature $T_i$ on the inner surface of the preform exceeds 100° C. at the highest. It will, therefore, be learned that while being conveyed to the blow-molding machine 52, the preform is establishing and holding the "heated sterilizing state" due to heat held by itself. As described above, further, the inner surfaces of the clean box I and the outer surfaces of the compression-molding machine 31 and the blow-molding machine 52 have been sterilized with the chemical agent and, besides, the interior of the clean box I is maintained in a positive-pressure state with the filtered clean air. The preform is conveyed to the hygienic blow-molding machine 52 maintaining the "heated sterilizing state", and the biaxial stretch-blow molding is conducted by the hygienic blow-molding machine 52. As a result, a PET bottle is formed having a very high aseptic level.

The graph shows fluctuation in the temperature of the preform of when it is taken out depending upon the time [seconds] for molding the preform. That is, when the time for molding the preform is 6 seconds, the temperature of the preform of when it is taken out is about 60° C. When the time for molding the preform is shorter than 6 seconds, however, the temperatures $T_i$, $T_o$ on the inner and outer surfaces become higher at the time of taking out the preform.

From the graph, further, it will be learned that the temperature of the preform at the time when it is taken out varies depending upon the temperature of the drop that is thrown in and the temperature for cooling the metal mold in addition to the time [seconds] for molding the preform. Therefore, the temperature of the preform of when it is taken out can be preferably controlled by varying any one of these parameters (time [seconds] for molding the preform, temperature of the drop that is thrown in, temperature for cooling the metal mold) or by varying a plurality of these parameters. Namely, it is made possible to preferably control the "heated sterilizing state" of the preform.

The higher the temperature of the preform is when it is taken out, the more it is preferred for the preform placing in the "heated sterilizing state". On the contrary, however, if the temperature on the surface of the body portion of the preform at the time when it is taken out exceeds the "glass transition temperature+8" (° C.) of the synthetic resin, the body portion may be deformed at the time of removing the preform from the core metal mold 35 (core) of the metal mold. Further, the mouth portion may deform if the temperature on the surface of the mouth portion exceeds the "glass transition temperature+2" (° C.) of the synthetic resin. Therefore, when, for example, a synthetic resin having a glass transition temperature of 77 to 78° C. is used, i.e., a polyethylene terephthalate is used, it is desired that the temperature of the preform of when it is taken out is not higher than 86° C. on the surface of the body portion of the preform and is not higher than 80° C. on the surface of the mouth portion of the preform. In order to maintain the preform in the "heated sterilizing state", further, it is necessary that the temperature of the preform of when it is taken out is at least not lower than 60° C. at the lowest temperature portion on all of the surfaces by taking into consideration the case when the preform includes a thin portion where the temperature cannot be sufficiently elevated by the heat held by itself, and is not lower than 65° C. by taking safety into consideration. From the foregoing, the temperature of the preform of when it is taken out is desirably not lower than 60° C. at a portion of the lowest temperature on all of the surfaces of the preform and, more preferably, not lower than 65° C. Further preferably, when the preform is made from a synthetic resin having a glass transition temperature of 77 to 78° C., e.g., the polyethylene terephthalate having the above glass transition temperature, it is desired that the temperature is not higher than 80° C. on the surface of the mouth portion and is not higher than 86° C. on the surface of the body portion of the preform.

EXAMPLE 1

Figure 5:
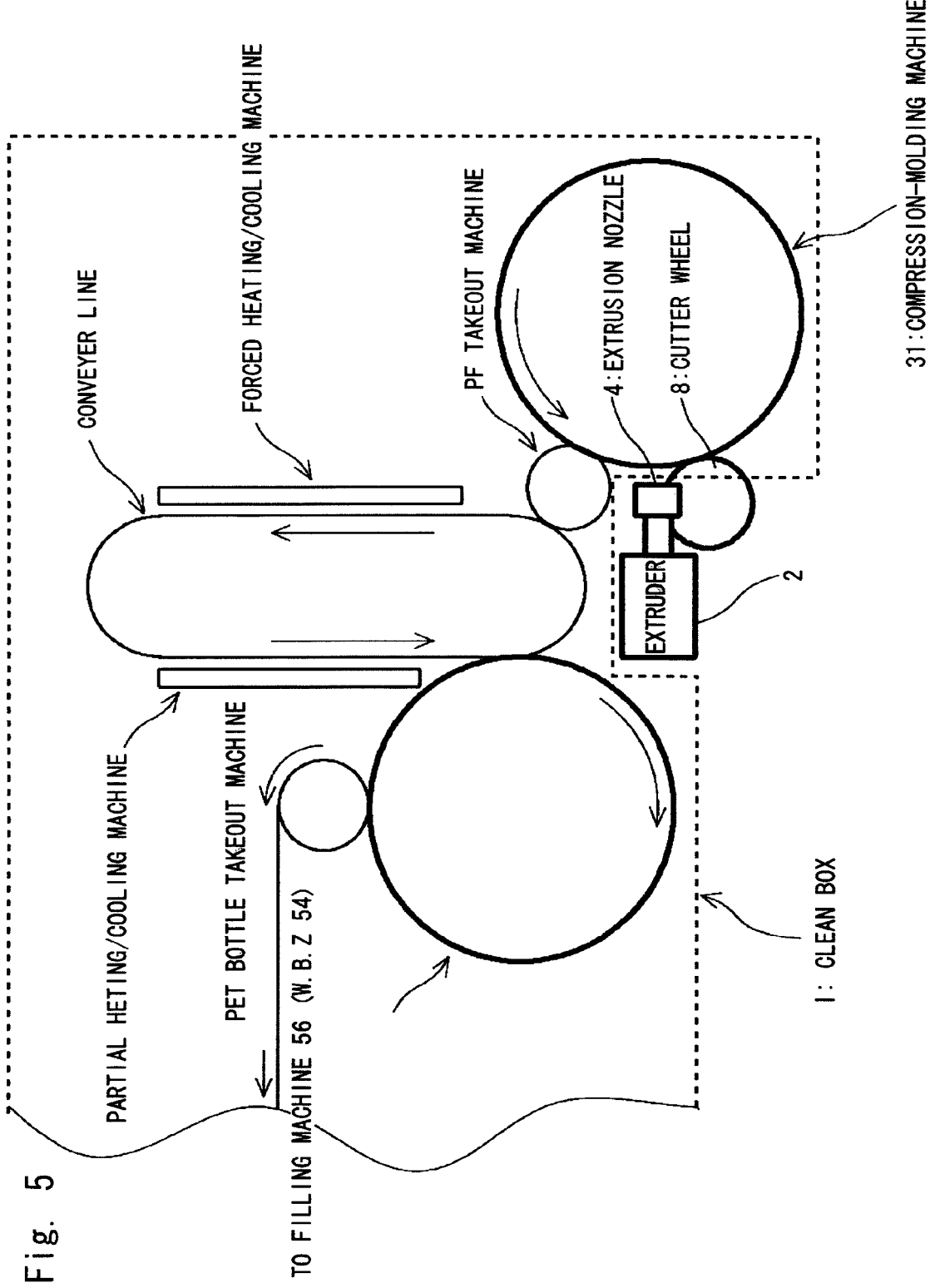
[FIG. 5] is a view illustrating the constitution of a compression-molding machine and a blow-molding machine according to the first embodiment.

Here, in the biaxial stretch-blow molding, there is a temperature differential between the front surface and the interior of the preform (i.e., $T_c-T_o>0$ in FIG. 4). If the temperature differential is great, the PET bottle having a predetermined quality is not often obtained due to thermal strain. Therefore, if there is a temperature differential between the front surface and the interior of the preform, it is desired to so set the temperature differential that no effect is produced by the thermal strain and that the orientation is effectively attained by the biaxial stretching. As shown in FIG. 5, therefore, a conveyer line may be provided between the compression-molding machine 31 and the blow-molding machine 52, and the forced heating/cooling apparatus may be installed as equalizer means along the conveyer line. The equalizer means may be further used for equalizing a difference in the temperature profile which is dependent upon the thickness profile of the preform. Further, a partial heating/cooling. apparatus may be installed for correcting (finely adjusting) thermal conditions (thermal properties) of the preform depending on the stretch-blowing conditions by effecting additional heat treatment by partly heating or cooling the preform.

The system for conveying the preform by the conveyer line is preferably a neck conveyer system which grips a neck portion under the mouth portion of the preform by using a gripping mechanism (not shown) such as gripper. Upon conveying the preforms by the neck conveyer system, the preforms can be homogeneously heated and cooled to accurately control the temperature of the preforms. As the heating/cooling apparatus, there can be used an ordinary infrared-ray heater or a ventilating device.

According to the system A for aseptically filling the PET bottle with a beverage of the present invention, the preforms are molded from a molten resin by compression molding. Therefore, the produced preforms can all be taken out in a high-temperature state from the metal mold for molding of the compression-molding machine 31 and can be fed to the blow-molding machine 52 of the next step maintaining the high-temperature state. That is, the produced preforms are all conveyed to the blow-molding machine 52 of the next step maintaining the "heated sterilizing state" due to heat held by themselves, and are readily blow-molded without being excessively left to cool due to excess of waiting time. Moreover, the inner surface of the clean box I and the outer surfaces of the units (compression-molding machine 31, blow-molding machine 52, filling machine 56, screwing machine 58) are sterilized with the chemical agent and, besides, the interior of the clean box I is maintained in a positive-pressure state with the filtered clean air. As a result, the PET bottles are molded (produced) in a very hygienic and clean environment in addition to that the preforms are placed in the "heated sterilizing state". Therefore, the "aseptic level of the PET bottles" that are produced can be greatly improved. This makes it possible to omit, from the filling system, the bottle sterilizing machine that has heretofore been arranged downstream of the bottle-producing unit C or to simplify the bottle sterilizing machine.

According to the system A for aseptically filling the PET bottle with a beverage of the present invention, the liquid feed line is sterilized with aseptic water of a high temperature and, therefore, the beverage fed from the beverage heat-sterilizing machine H to the filling machine 56, too, maintains a high aseptic level. Moreover, upon arranging the blow-molding machine 52 and the filling machine 56 neighboring each other and directly coupled to each other, the PET bottle of a high "aseptic level" maintaining the sterilizing state can be filled with the sterilized beverage through the aseptic filling line without delay in time and can be sealed.

Further, upon arranging the blow-molding machine 52 and the filling machine 56 neighboring each other and directly coupled to each other, there is a probability that the beverage may partly adhere on the outer surface of the blow-molding machine 52 causing germs to propagate. By providing the WBZ 54 between the bottle-producing unit C and the filling/sealing unit D, however, the beverage is prevented from deteriorating the "aseptic level of the PET bottles". Accordingly, the system A for aseptically filling the PET bottles with a beverage of the present invention is capable of producing PET bottles maintaining a high aseptic level without the need of providing the bottle sterilizing machine, and favorably producing PET-bottled beverages maintaining a high aseptic level.

Though the embodiment has dealt with the system A for aseptically filling the PET bottle with a beverage, the invention is in no way limited thereto only but can be adapted to various applications.

For example, if there is a section in which the preform or the PET bottle maintains a high-temperature state necessary for sterilization from where the preform is taken out from the compression-molding machine 31 till where it is sealed by the screwing machine 58 (after the bottle is molded and the beverage is filled), then the clean box may be omitted or simplified over this section.

Further, when there is the WBZ 54 between the front of the filling machine 56 and the blow-molding machine, there may be provided a rinser for washing the bottle after blow-molded with aseptic water or a washing machine that uses the charge-removed air between the filling machine 56 and the WBZ 54. Or, when it is desired to further increase the aseptic level of the bottle, there may be provided a bottle-sterilizing machine which is capable of conducting easy sterilization.

As the synthetic resin material of the container, there can be used a polyester resin such as polyethylene naphthalate, polybutylene terephthalate or polylactic acid, or a polyolefin resin such as polyethylene or polypropylene not being limited to the polyethylene terephthalate. As required, further, there may be used a multiplicity of layers or a blend of resins having gas-barrier property or oxygen-absorbing property (e.g., polyamide resins disclosed in JP-A-2005-342904).

Further, the container is not limited to the bottle (bottle-type container with a narrow mouth) but may be a container with a wide mouth, a cup-type container and the like.

Further, the sealing member is not limited to the cap but may be a film (single resin layer or a multiplicity of resin layers, multiplicity of resin layers including an aluminum foil layer). The sealing method is not limited to the screwing (screwing machine 58) by using the screw-type cap, but may be a plug by cap fitted to the mouth portion of the container abolishing screw (plug-type cap and a plugging machine), adhesion or heat-melt adhesion (heat seal) with a film, or a combination of heat seal with a film and the screwing with a cap as disclosed in JP-A-2006-290369. Though the bottle-producing unit (blow-molding machine 52: one-stage blow-molding machine) was described as the container-producing unit, there may be employed a blow-molding machine based on a two-stage blow molding as disclosed in JP-A-2003-103609 or a cup-molding machine in which the metal mold effects the molding based on the shrink back after the blow molding as disclosed in JP-A-2004-291621.

Moreover, a food feed unit and a food heat-sterilizing machine may be installed instead of the beverage feed unit G and the beverage heat-sterilizing machine H, the filling machine may be replaced by the one for treating foods, and foods may be aseptically filled.

The metal mold for compression-molding the preform and the method of producing blow-molded containers according to a second embodiment of the invention will now be described by using the system A for aseptically filling the PET bottles with a beverage.

This embodiment is different from the above first embodiment shown in FIGS. 1 and 2 with regard to only the metal mold for compression molding in the system A for aseptically filling the PET bottles with the beverage and the preform. Therefore, the following description does not deal with the constitution of the system A for aseptically filling the PET bottles with the beverage of FIGS. 1 and 2.

Described below in detail are, therefore, the metal mold for compression-molding the preform and the preform molded by using the metal mold for compression molding.

Figure 7:
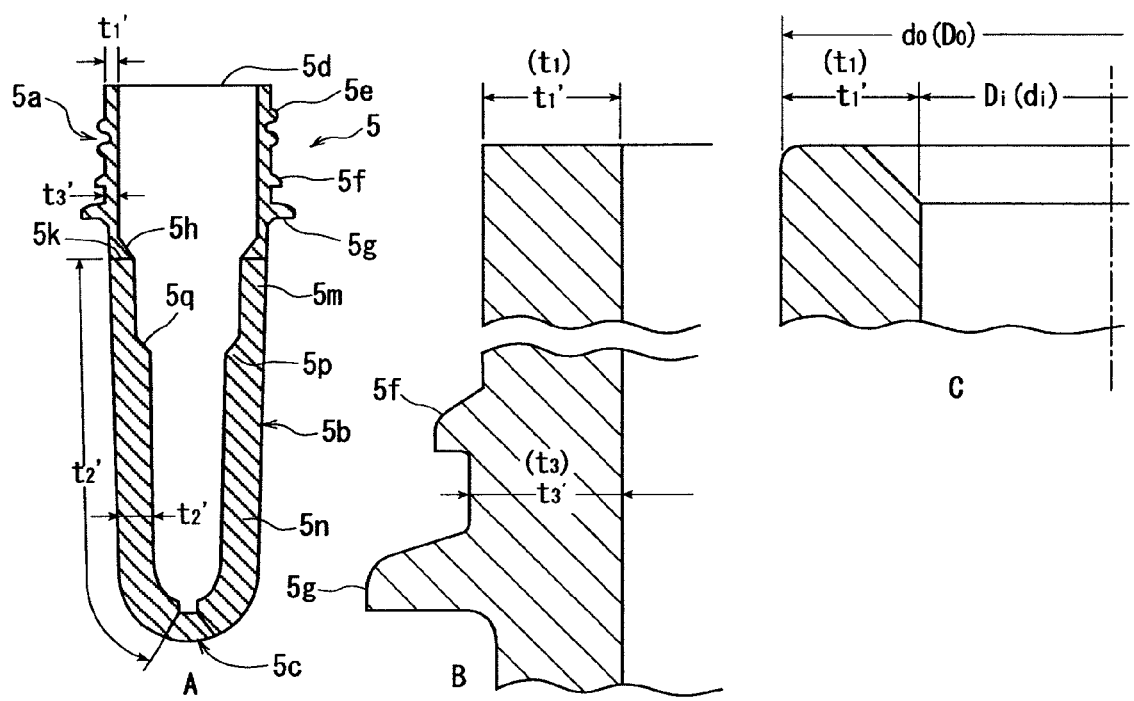
[FIG. 7] is a sectional view of a state where the preform according to the second embodiment of the invention is cut in the up-and-down direction, wherein A is a sectional view of the whole preform, B is a sectional view showing, on an enlarged scale, a case where the upper end of the mouth portion of the preform has a sharp shape, and C is a sectional view showing, on an enlarged scale, a case where a tapered surface is formed in the upper end portion of the mouth portion.

First, a preform 5 shown in FIG. 7 will be described. Referring to FIG. 7A, the preform 5 includes, from the upper portion toward the lower portion, a mouth portion 5a, a body portion 5b and a bottom portion 5c. The mouth portion 5a includes an opening 5d through which a beverage or the like is poured in or out when the container is molded, an externally threaded portion 5e onto which the internal thread of the cap will fit, an annular napiformed portion (annular rib portion) 5f arranged at a lower portion of the externally threaded portion 5e, and a neck ring portion 5g. The body portion 5b of the preform 5 is formed under the neck ring portion 5g. In this embodiment, a connection portion 5k is provided to connect the mouth portion 5a and the body portion 5b together. In the connection portion 5k in this embodiment, the preform 5 has an inner wall of which the diameter decrease downward and inward from the upper end to lower end portion of the neck ring portion 5g, and is connected to the body portion 5b having a thickness t2' larger than the thickness t1' of the upper part of the mouth portion 5a via a tilted portion 5h of a shape close to a tilted surface of a circular truncated cone. The body portion 5b includes an upper body portion 5m continuing from the connection portion 5k and a lower body portion 5n connected via a connection portion 5p. In the connection portion 5p, the inner wall of the preform has a diameter that decreases downward and inward, and is forming a tilted surface 5q close to a tilted surface of a circular truncated cone. The upper body portion 5m is, usually, in a range of up to 20 mm from under the neck ring, and has a thickness smaller than the thickness of the lower body portion 5n. However, the thickness may be maintained the same to omit the connection portion 5p. According to this system, the thickness conditions that will be described later are satisfied toward the lower side from at least 5 mm under the neck ring portion 5g in order to embody a preferred temperature for taking out the preform from the metal mold.

In this embodiment as shown in FIG. 7A, further, the bottom portion 5c of the preform 5 has nearly a semispherical shape, and at least a portion of the bottom portion 5c that is continuous to the body portion 5b has a thickness larger than the thicknesses t1', t3' of upper portions of the mouth portion 5a. The thickness of the bottom portion 5c itself may be suitably set depending upon whether this portion be stretched or blow-molded. If the bottom portion 5c is to be stretched or blow-molded, the thickness is set to be larger than t1', t3'. If the bottom portion 5c is not to be stretched or blow-molded, the thickness may be set to be equal to, or smaller than, the thicknesses t1', t3'.

Figure 9:
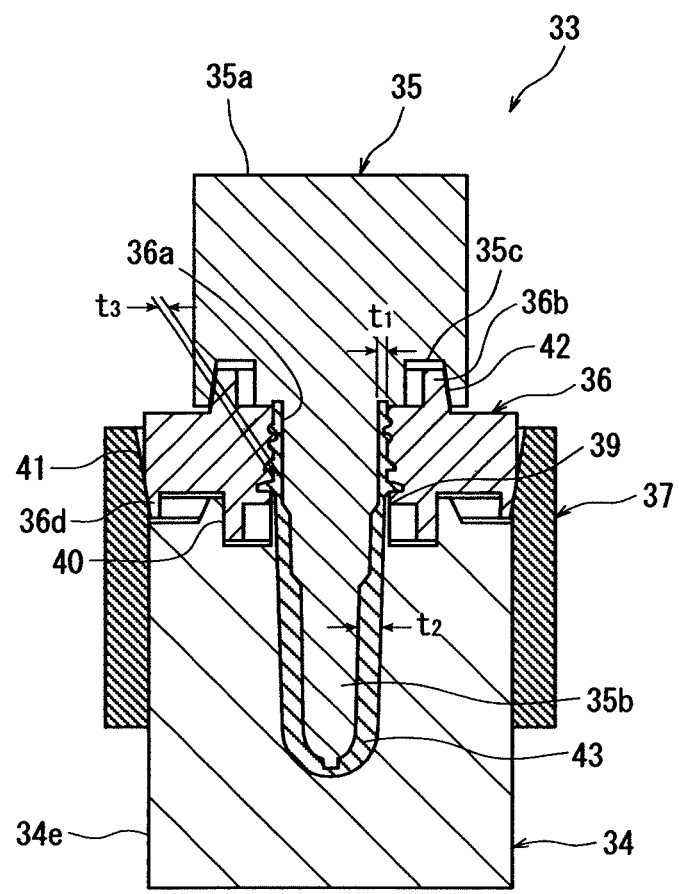
[FIG. 9] is a sectional view in a state where the metal mold for compression-molding the preform shown in FIG. 6 is tightened.
Figure 10:
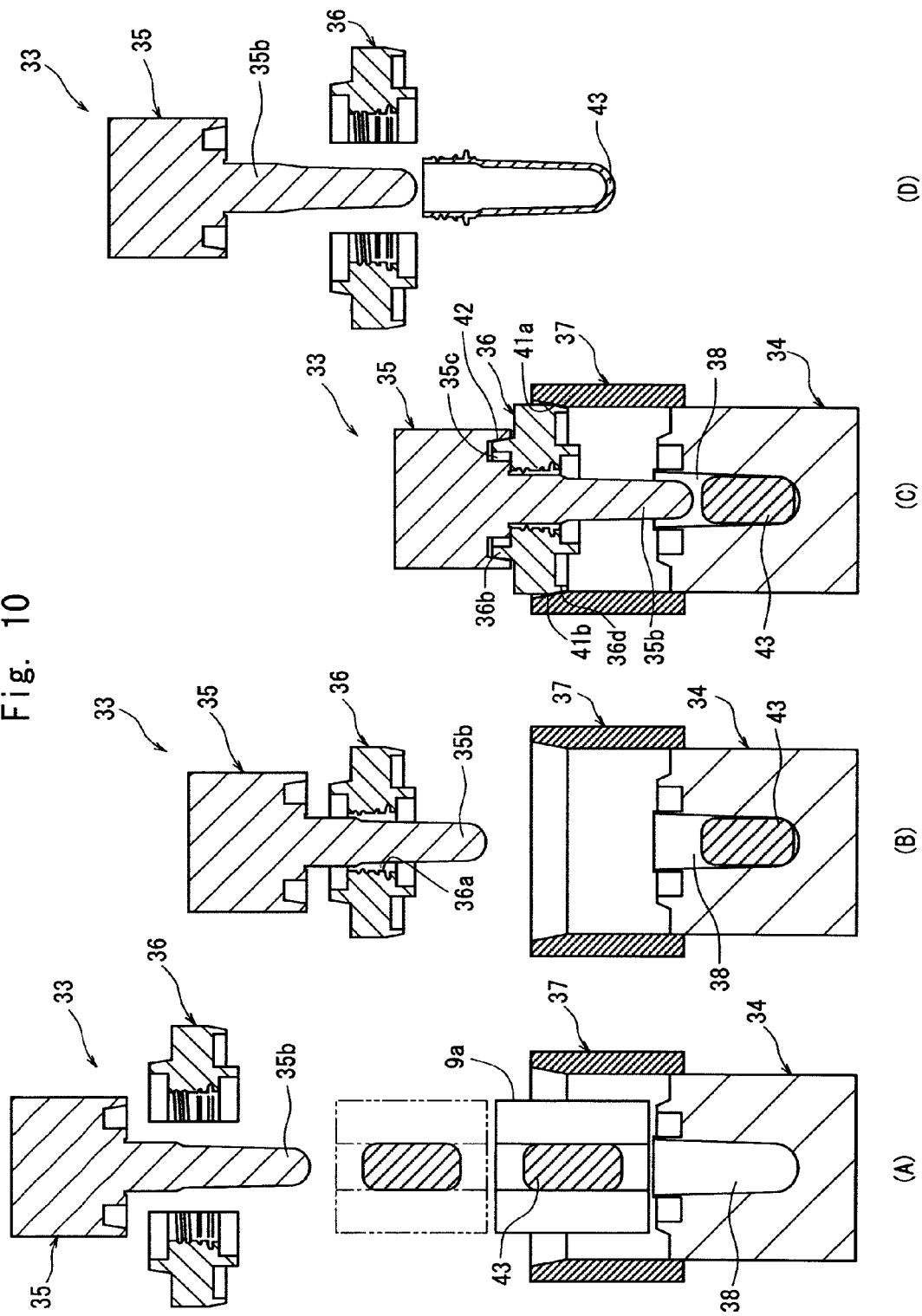
[FIG. 10] is a view of steps illustrating the procedure of operating the metal mold for compression-molding the preform according to the second embodiment of the invention, wherein A is a sectional view of a state where a molten resin is conveyed by a grip member into a cavity metal mold at an initial position of the preform that is molded by the metal mold for compression molding, B is a sectional view of a state where the molten resin is fed into the cavity metal mold, and a core metal mold and a slide insert metal mold are descending, C is a sectional view of just before the metal mold is tightened, and D is a sectional view of a state after the metal mold of FIG. 9 has been tightened from C, the preform is separated away from the core metal mold and the slide insert metal mold.

In the metal mold for compression molding that will be described later, a space is formed as shown in FIG. 9 for forming thick portions of the preform, and space widths t1, t2 and t3 are set to values close to the thicknesses t1', t2' and t3' of the preform. Depending upon the resin to be compression-molded, however, the space widths are set to values slightly greater than t1', t2' and t3' by taking a contraction factor and the like into consideration.

The upper end of the mouth portion 5a may have a corner of a sharp edge as shown in FIG. 7B, or may be chamfered or rounded to some extent for beveling the corner as shown in FIG. 7C. When the corner is beveled to some extent, t1 is determined by determining the inner diameter Do of the metal mold (diameter corresponding to the outer diameter do of the molded preform) for forming the upper end of the outer diameter portion of the mouth portion 5a and by determining the outer diameter di (diameter corresponding to the inner diameter Di of the molded preform) for forming the upper end of the inner diameter portion as shown in FIG. 7C, i.e., t1=(Do−di)/2. When it is difficult to inspect or measure the outer diameter or the inner diameter of the inner and outer diameter portions at the upper ends thereof, t1 may be set and fabricated by determining the sizes at the portions that can be easily inspected and where the values do not much vary from the values of the inner and outer diameter portions at the upper ends thereof, such as a portion 0.7 mm or 2.5 mm under the top panel of the mouth portion 5a.

FIGS. 8 and 9 show the metal mold for compression molding, wherein FIG. 8 is a sectional view of a state where the metal mold for compression molding is opened, and FIG. 9 is a sectional view of a state where the metal mold for compression molding is closed.

The metal mold 33 for compression molding includes a cavity metal mold 34 which is a female mold, a core metal mold 35 which is a male mold, a slide insert metal mold 36 which is a split mold, and a guide ring 37 arranged surrounding the cavity metal mold 34. The core metal mold 35 is arranged on the upper side in the up-and-down direction, the slide insert metal mold 36 is arranged at the lower part of the core metal mold 35, and the cavity metal mold 34 is arranged below them.

The cavity metal mold 34 is nearly of a cylindrical shape forming a cavity 38 having a circular opening 34a in the central portion on the inside thereof and at an upper side thereof, the cavity 38 being so formed as to extend downward nearly vertically from the opening 34a. The inner circumferential surface of the cavity 38 forms the outer circumferential surface of the preform.

The core metal mold 35 has a support portion 35a at an upper part thereof, and a core body 35b of nearly a cylindrical shape is provided on the lower part of the support portion 35a extending downward from the center on the lower surface of the support portion 35a. The outer circumferential surface of the core body 35b forms the inner surface of the preform. A diameter-decreasing portion 35d of which the diameter decreases downward and inward in the radial direction is formed on a portion of the core body 35b that forms the inner wall of the connection portion 5k that is a boundary portion between the mouth portion 5a and the body portion 5b, to thereby form the tilted portion 5h of the preform.

In the lower surface of the support portion 35a is formed an annular recessed portion 35c being recessed upward in concentric with the core body 35b.

The slide insert metal mold 36 is split right and left into two of semicircles which are symmetrical relative to the vertical surface, and together forms an annular shape. The slide insert metal mold 36 forms a nozzle-forming hole 36a which penetrates through the center up and down in a state where the split molds are assembled together. The nozzle-forming hole 36a forms an outer circumferential surface of the mouth portion (also called nozzle portion) 5a of the preform and a portion on the upper side of the mouth portion 5a and, further, serves as a nozzle-forming portion for forming the external thread 5e, napiformed portion 5f and neck ring portion 5g.

The cylindrical guide ring 37 is arranged along the outer circumferential surface 34e of the cavity metal mold 34, and can slide along the outer circumferential surface 34e in the up-and-down direction. The guide ring 37 is forming, at its upper end portion, a tapered inner circular truncated cone surface 41a having a diameter expanding upward and outward in the radial direction. At the time when the metal mold 33 for compression-molding the preform is to be tightened, the inner circular truncated cone surface 41a slides on the outer circular truncated cone surface 41b of the slide insert metal mold 36 to some extent and comes in contact thereto to form an initial fitting portion 41 (FIG. 9).

Referring to FIG. 9, when the metal mold 33 for compression-molding the preform is tightened, there are formed the same space as the one for the preform 5 shown in FIG. 7A, and a gap t1 of the same size as the thickness t1' of the upper part of the mouth portion of the preform 5 is formed between the core body 35b and the insert metal mold 36. Between the core body 35b and the cavity metal mold 34, further, there are formed gaps of nearly the same sizes as the thickness t3' from under the napiformed portion 5f to over the neck ring portion 5g of the preform 5, the thickness t2' of the body portion, and the thickness of the bottom portion.

Further, though not described, the core metal mold 35 and the slide insert metal mold 36 are provided with moving means for moving them up and down, and the slide insert metal mold 36 is, further, provided with a slide mechanism for opening and closing it right and left.

A rotary preform takeout mechanism 50 is arranged on the downstream of the compression-molding machine 31 (FIGS. 2 and 6) to transfer the preform 5 from the compression-molding machine 31 to the blow-molding machine 52. The blow-molding machine 52 stretches the preform with the air of a high pressure to mold the PET bottle.

The WBZ 54 (FIG. 1) is provided as the sterilized partitioning wall between the bottle-producing unit C and the filling/sealing unit D on the continuous line on the downstream side. The WBA 54 prevents the beverage from partly flying into the bottle-producing unit C to deteriorate the aseptic level of the molded PET bottles.

The filling/sealing unit D includes a filling machine 56 for filling the PET bottle with the beverage of a predetermined amount and a screwing machine 58 for sealing the PET bottle fed from the cap-sterilizing unit E. The filling machine 56 is fed with a beverage prepared by a beverage feed unit G and sterilized by a beverage heat-sterilizing machine H.

The cap-sterilizing unit E has a cap-sterilizing machine 59 for sterilizing the screw-type cap fed from the cap feed unit F.

The compression-molding machine 31, blow-molding machine 52, filling machine 56, screwing machine 58 and cap-sterilizing machine 59 are arranged in the clean box I.

The clean box I is a means for purifying the environment in which the machines are installed by nearly shielding interior thereof from the general environment, and maintaining the interior clean and under a positive pressure by introducing the clean air. The clean air is obtained by passing the air from the general environment through the HEPA filter or the ULPA filter.

Next, described below is a procedure for molding the preform by using the metal mold 33 for compression-molding the preform.

Figure 6:
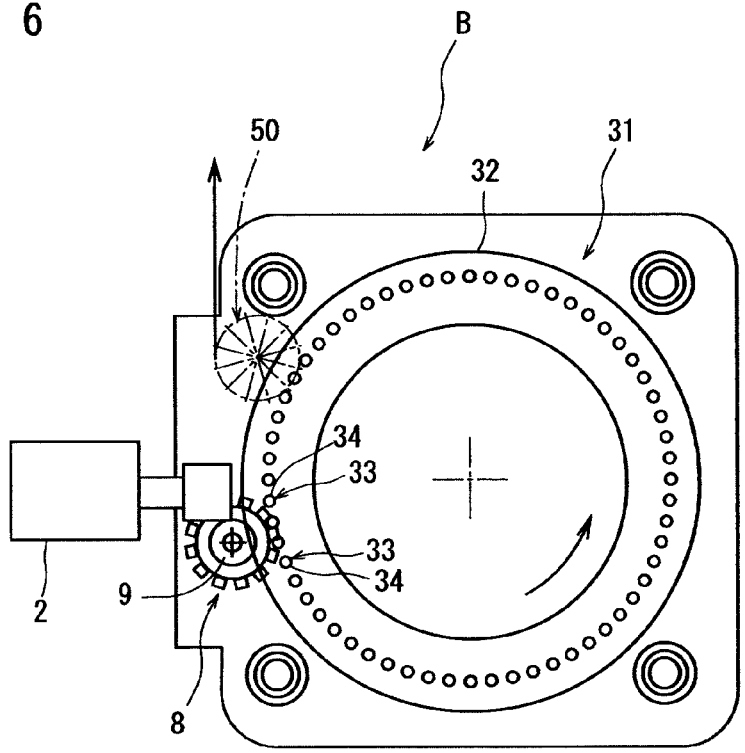
[FIG. 6] is a plan view schematically illustrating, on an enlarged scale, the compression-molding machine of FIG. 2 and a resin feed machine in a preceding step.

Referring to FIG. 6 and FIG. 10A, the cavity metal mold 34 moves along a circular track due to the rotary support body 32. On the other hand, a grip member 9a for gripping the molten resin 43 provided on the cutter wheel 8 rotates on a circular track separate from the cavity metal mold 34. FIG. 10A shows one of a plurality of compression-molding metal molds 33 in the compression-molding machine 31. In the initial state, the cavity metal mold 34, slide insert metal mold 36 and core metal mold 35 are arranged being spaced apart up and down. The circular tracks of the grip member 9a and of the cavity metal mold 34 have a common contact point (tangent) in the up-and-down direction, and are so constituted as to feed the molten resin 43 (drop) to the bottom portion of the cavity 38 of the cavity metal mold 34.

After having fed the molten resin 43 to the cavity metal mold 34, the grip member 9a separates away from the track of the cavity metal mold 34, and the core metal mold 35 and the slide insert metal mold 36 move down as shown in FIG. 10B. Next, the slide insert metal mold 36 opening toward the right and left is caused to move toward the core metal mold 35, and is closed to assume an annular shape. In this state, the core body 35b of the core metal mold 35 penetrates through the nozzle-forming hole 36a.

Referring to FIG. 10C, as the core metal mold 35 further moves down, a tip portion of the core body 35b enters into the cavity 38, and the slide insert metal mold 36 comes in contact with the guide ring 37. That is, an outer circular truncated cone surface 41b of an outer convex portion 36d on the lower outer circumferential portion of the slide insert metal mold 36 temporarily comes in contact with the inner circular truncated cone surface 41a of the upper inner circumferential surface of the guide ring 37 and, thereafter, these surfaces slide being fitted to each other, and the guide ring 37 and the slide insert metal mold 36 come in contact with each other being centered together. Further, the slide insert metal mold 36 has its annular protruded portion 36b on an upper part thereof fitted and contacted to the annular recessed portion 35c to form a fitting portion 42. At the lower part of the slide insert metal mold 36, the outer convex portion 36d is fitted and contacted to the guide ring 37.

As the core metal mold 35 further moves down from the state of FIG. 10C, the core body 35b starts compressing the molten resin 43. Due to the core metal mold 35 that has moved down, the slide insert metal mold 36 and the cavity metal mold 34 come in contact at the fitting portion 40 and the fitting portion 39. After the core metal mold 35 has moved down to the lowermost end position as shown in FIG. 9, a gap of the shape of the preform is formed by the cavity metal mold 34, core metal mold 35 and slide insert metal mold 36, and is filled with the molten resin 43, and the metal mold is tightened.

The slide insert metal mold 36, core metal mold 35 and cavity metal mold 34 have been cooled down to 15° C. by the circulation of cooling water that is not shown. When the metal mold is tightened, therefore, the molten resin 43, too, is cooled in the state shown in FIG. 9, and the temperature on the surface of the mouth portion 5a decreases with an increase in the time for maintaining the metal mold tightened. In this embodiment, the mouth portion 5a of the preform 5 has a small thickness. Therefore, not only the surface of the mouth portion 5a but also the interior of the thickness thereof are cooled relatively quickly. However, the body portion 5b and the bottom portion 5c are thicker than the mouth portion 5a. Therefore, even if the surface starts cooling, the interior of the thickness is still in the state of a high temperature. As the molten resin 43 is cooled and reaches a temperature at which it is to be taken out from the metal mold for molding, the metal mold 33 for compression molding undergoes the opening operation, and the core metal mold 35 and the slide insert metal mold 36 are both moved up. The preform 5 has its nozzle-forming portion held by the core metal mold 35, and moves up together with the core body 35b.

Next, referring to FIG. 10D, the core metal mold 35 and the slide insert metal mold 36 are parted, and the preform 5 is pulled out from the core body 35b. Thereafter, the slide insert metal mold 36 is opened toward the right and left, and the preform is removed from the slide insert metal mold 36.

After parted from the metal mold 33 for compression molding, the preform 5 has a high temperature in the interior thereof. Therefore, heat conducts from the interior to the outer sides, and the temperature rises on the surfaces. Though dependent upon the thickness of the preform and the condition for cooling the metal mold, the temperature on the surfaces of the preform usually reaches nearly a maximum temperature in about 2 to 10 seconds after it was taken out from the metal mold, and the temperature differential from the interior of the preform decreases to lie in a range that is suited for the blow molding.

Here, the temperature at the mouth portion 5a is better low at the time of taking out the preform from the male mold (core metal mold) after the compression molding has been finished or at the time of sealing with the compressed air (sealing the nozzle) from the standpoint of preventing the mouth portion 5a of the preform 5 from being deformed. On the other hand, if the temperature is low in the body portion 5b, heat must be added by using an infrared-ray heater such as of near infrared ray, hot air or radiant heat for effecting the blow molding. In the case of, for example, the PET resin having a glass transition temperature of about 77 to 78° C., the surface temperature conditions for blow-molding the body portion 5b and the bottom portion 5c consist of a lower limit of surface temperature of, preferably, 80° C. which is in excess of the glass transition temperature of the preform and an upper limit of 120° C. for preventing whitening or irregular thickness at the time of blow molding and for obtaining stable moldability. Upon conducting the blow molding while imparting a temperature profile to the body portion 5b of the preform within the above temperature range, the thickness profile of the bottle after molded is adjusted. If the surface temperature (about 70° C.) is slightly lower than the lower-limit value, the blow molding can often be conducted without heating since the temperature in the interior of the thickness of the preform is higher than that on the surface. If it is necessary to impart the temperature profile to the preform, therefore, such a portion may be heated for a short period of time by using a heating device such as an infrared-ray heater to effect the blow molding without using a full-fledged heating device. Further, when the preform has a surface temperature (e.g., about 130° C.) in excess of the upper-limit value or when the temperature profile is to be imparted to the preform in the decreasing direction, a favorable blow moldability can be attained by slightly cooling the portion on the surface of the preform with the air on the way from the compression molding to the blow molding.

In conducting the compression molding, if the metal mold is tightened for an extended period of time, the preform is cooled for an extended period of time and the mouth portion 5a becomes little likely to be deformed. However, the preform must be heated to a temperature necessary for conducting the blow molding. If the metal mold is tightened for a short period of time, the temperature necessary for conducting the blow molding is readily reached, but the mouth portion 5a is deformed. Namely, it is difficult to simultaneously control the temperatures for cooling the mouth portion 5a and for blow-molding the body portion 5b. If the temperature of the mouth portion 5a is adjusted to be low to prevent the mouth portion 5a from being deformed, the temperature becomes low in the body portion 5b, and a lot of additional facilities become necessary, such as a heating device, etc.

According to this embodiment, the thickness t1' at the upper part of the mouth portion 5a of the preform and the thickness t3' from under the napiformed portion to over the neck ring, are maintained to be small and the thickness t2' of the body portion 5b is maintained to be large (in the metal mold, t1 and t3 are selected to be small, and t2 is selected to be large). Therefore, the mouth portion 5a cools quickly while the temperature is maintained to be high in the body portion 5b and in the bottom portion 5c. Therefore, use of the heating apparatus such as infrared-ray heater becomes less necessary or can be omitted.

It is important for the upper part of the mouth portion 5a to maintain dimensional stability from the standpoint of maintaining sealing of the content by being fitted with the cap. Therefore, the space width t1 of the metal mold for forming the thickness t1' of the upper part of the mouth portion 5a is based on the space with t2 of the metal mold for forming the thickness t2' of the body portion 5b. Of the mouth portion 5a, further, importance is given to the thickness of the end (upper) portion of the mouth portion 5a. This is because, the load of about 1000 N is exerted on the mouth portion at the time of blow molding due to the sealing with the air of a high pressure and, therefore, the end of the mouth portion must be capable of withstanding the load.

Further, if the thickness under the napiformed portion is close to the thickness of the body portion, this portion, too, is deformed at the time of blow molding by the pressure of blow molding (pressure of the compressed air: about 3 MPa). Therefore, the space width t3 of the metal mold for forming the thickness t3' under the napiformed portion, too, is based on t2.

From the standpoint of sterilization, further, the temperature at which the preform is taken out is better high for placing the preform in the "heated sterilizing state". In this embodiment, the temperature is not lower than at least 60° C. at the lowest temperature portion on the surface of the preform 5 to maintain the preform 5 in the sterilized state.

Referring to FIG. 1, the takeout mechanism 50 for taking out the molded preform 5 from the cavity metal mold 34 is arranged on the downstream of the compression-molding machine 31 in the direction of rotation, and, as shown in FIG. 10D, the preform 5 taken out from the slide insert metal mold 36 is rotationally conveyed to the blow-molding machine on the downstream thereof by using the takeout mechanism 50 that is not shown.

The molded preform 5 is handed over to the takeout mechanism 50. When the temperature of the preform being conveyed is low in the takeout mechanism 50, the preform 5 must be heated by using an infrared-ray heater or the like. In this embodiment, the body portion 5b and the bottom portion 5c have high temperatures, and the heating by using the infrared-ray heater may be omitted or may be used little.

That is, the preforms after compression-molded are successively taken out from the compression-molding metal mold 33, and are thrown into the blow-molding machine 52. Therefore, if the molding rate of the blow-molding machine 52 is larger than the molding rate of the compression-molding metal mold 33, the compression-molded preforms can be readily subjected to the blow molding without waiting time before the blow molding. The preforms 5 conveyed from the takeout mechanism 50 to the blow-molding machine are set into the blow-molding metal mold where the air of a high pressure is injected therein, and the preforms are molded into the containers being stretched in the longitudinal and transverse directions. With the compression-molding machine 31, takeout mechanism 50 and blow-molding machine 52 being mechanically coupled together by using gears, or being electrically brought into synchronism by using servo motors so that the compression-molded preforms are brought to the blow molding maintaining a constant time, it is allowed to suppress dispersion in the temperature in the individual preforms just before the blow molding. Therefore, the blow molding can be conducted maintaining stability.

The filling machine 56 fills the PET bottle with the beverage of a predetermined amount via a filling line (liquid feed line) that has been heat-sterilized with aseptic water of a high temperature. The screwing machine 58 seals the mouth portion of the PET bottle filled with the beverage with the sterilized screw-type cap fed from the cap-sterilizing unit E. The cap-sterilizing unit E may use, for example, an EB (electron beam) irradiation device, a UV (ultraviolet ray) irradiation device or a peracetic acid rinser.

In this embodiment as described above, the machines are almost shield from the exterior by using the clean box I, and the PET bottles are filled with the beverage maintaining a high sterilization effect. The interior of the clean box I is regularly sterilized and washed, and is, therefore, regularly reset to the initial aseptic level.

EXAMPLE 2

A second embodiment of the invention will be described below.

Figure 11:
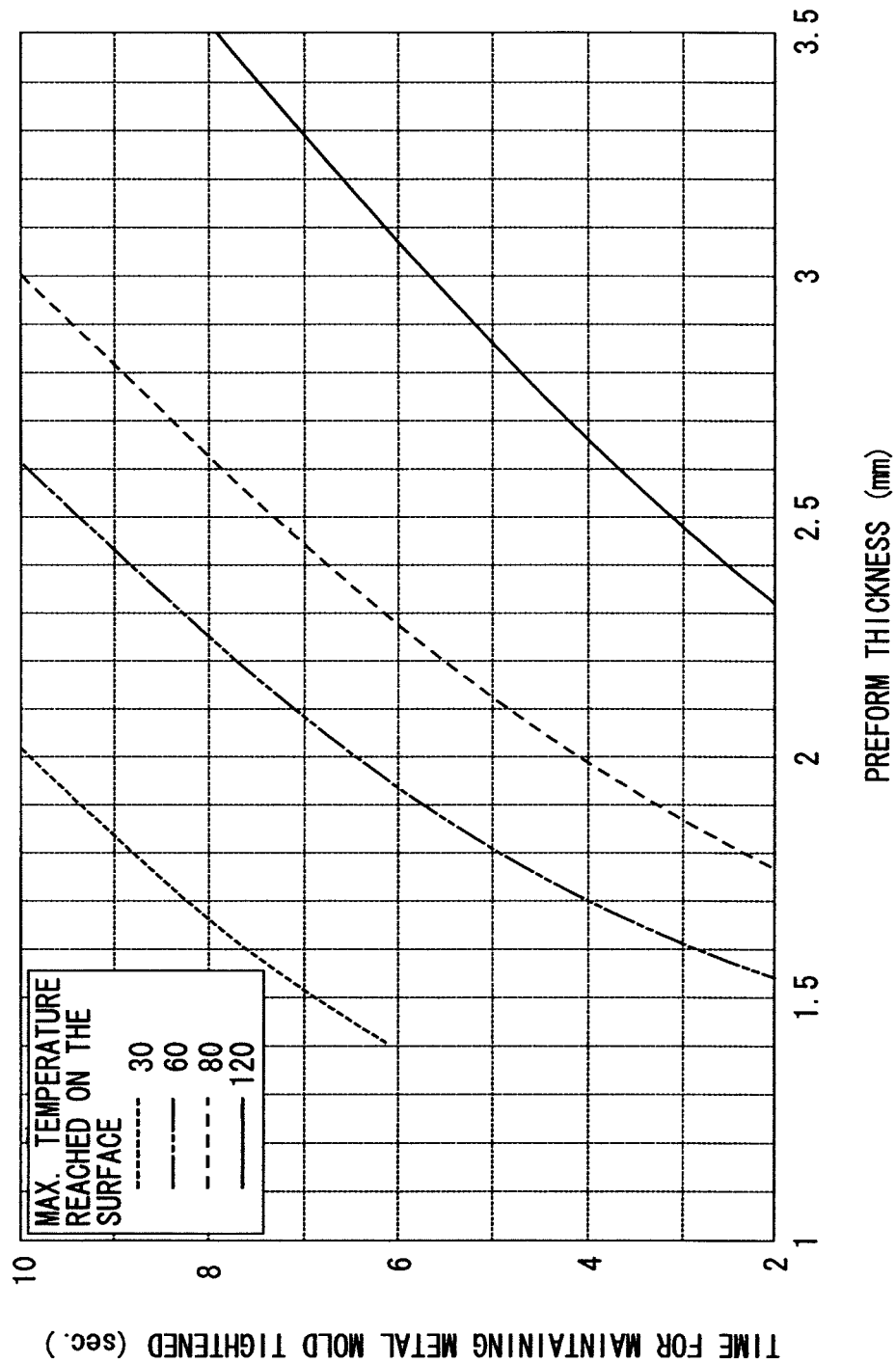
[FIG. 11] is a diagram illustrating relationships of the times for tightening the metal mold for compression molding (times for cooling the metal mold by closing the metal mold) needed for arriving at desired maximum temperatures for the thickness of the preform that is compression-molded (space width of the metal mold corresponding thereto).

FIG. 11 is a diagram illustrating relationships of the times for maintaining the metal mold tightened for compression molding (times for cooling the metal mold by closing the metal mold) needed for arriving at desired maximum temperatures for the thickness of the preform (space widths of the metal mold corresponding thereto) after the preform of a PET (polyethylene terephthalate) resin having a glass transition temperature of about 77 to 78° C. is taken out from the metal mold set at 15° C. The ordinate represents the time (seconds) for cooling the metal mold and the abscissa represents the thickness of the preform (space width of the metal mold corresponding thereto).

When a desired maximum temperature that can be reached and the time for cooling the metal mold have been determined, the thickness of the preform can, conversely, be found from FIG. 11. For example, if the desired maximum temperature that is reached is 60° C. and the time for cooling is 4 seconds, then the preform thickness (space width of the metal mold corresponding thereto) is 1.70 mm and if the time for cooling is 5 seconds, then the preform thickness is 1.82 mm (precise numeral values are shown here since they cannot be read out from the diagram). If the thickness (space width of the metal mold corresponding thereto) is less than 1.40 mm, the preform cannot be compression-molded. Therefore, the diagram is not drawn.

As described above, a preferred surface temperature of the preform right after being molded for effecting the blow molding is not lower than its glass transition temperature (about 77 to 78° C.) and is roughly 80° C. to 120° C. Upon blow-molding the preform by imparting a temperature profile to the body portion $5b$ within the above temperature range, the thickness profile of the bottle after molded is adjusted. When no sterilizing effect is required for the container, the temperature at the mouth portion $5a$ is better low and, desirably, not higher than 60° C. to suppress the mouth portion (nozzle portion) $5a$ of the preform $5$ from being deformed.

For effecting the blow molding, on the other hand, the body portion $5b$ must be maintained at a temperature in a range of 80 to 120° C. creating a temperature differential from the temperature at the mouth portion $5a$. To eliminate the temperature differential, the thickness of the mouth portion $5a$ (space width of the metal mold corresponding thereto) is set to be smaller than the thickness of the body portion $5b$ (space width of the metal mold corresponding thereto) so that the mouth portion $5a$ can be quickly cooled.

Therefore, the condition for effecting the blow molding is found, i.e., a ratio of the thickness $t1$ of the upper part of the mouth portion $5a$ (space width of the metal mold corresponding thereto) or the thickness $t3$ from under the napiformed portion to over the neck ring (space width of the metal mold corresponding thereto) and the thickness $t2$ of the body portion $5b$ (space width of the metal mold corresponding thereto ($t2/t1$) or ($t2/t3$) is found with reference to the diagram of FIG. 11.

In Table 1, the first column from the left shows the times for maintaining the compression-molding metal mold tightened, and the second and third columns from the left show thicknesses of the mouth portion $5a$ (space widths of the metal mold corresponding thereto) for setting maximum surface temperatures that can be reached to be upper limits of 30° C. and 60° C. after the preforms have been molded for each of the mold tightening times as found from FIG. 11. The fourth and fifth columns from the left show thicknesses of the body portion $5b$ (space widths of the metal mold corresponding thereto) for satisfying the lower-limit temperature 80° C. and the upper-limit temperature 120° C. under the blow-molding conditions after the preforms have been molded as found from FIG. 11.

The sixth to eighth columns from the left show the ratios ($t2/t1$) or ($t2/t3$) of the thicknesses $t1$ of the upper part of the mouth portions $5a$ (space widths of the metal mold corresponding thereto) and the thicknesses $t3$ from under the napiformed portion to over the neck ring portion found in the second and third columns from the left which are the objects of the embodiment, and the thicknesses $t2$ of the body portions $5b$ (space widths of the metal mold corresponding thereto) at each of the temperatures found in the fourth and fifth columns from the left.

As a result, if the nozzle temperature is set to be 30° C. to 60° C., the blow-molding conditions are satisfied upon selecting the thickness (space width of the metal mold corresponding thereto) ratio to lie in a range of 1.18 to 2.11 provided the time for maintaining the metal mold tightened is in a range of 3 to 8 seconds. Further, if the nozzle temperature is set to 60° C., the forcibly heating device shown in FIG. 5 can be omitted or dependence upon such devices can be decreased upon selecting the thickness (space width of the metal mold corresponding thereto) ratio to lie in a range of 1.18 to 1.56 provided the time for maintaining the metal mold tightened is in a range of 3 to 8 seconds. Moreover, the blow-molding conditions can be satisfied in an environment adapted to attaining aseptic conditions.

Though the embodiments of the invention were described above in detail with reference to the accompanying drawings, it should be noted that the invention is in no way limited to the above embodiments only but can be, further, varied or modified without departing from the scope of the invention.

For example, if the space width $t2$ of the metal mold for forming the preform body portion $5b$ satisfies the conditions of the invention, then the width may be varied within a range of the conditions. As for the space widths of the metal mold of the bottom portion $5c$ and connection portion $5k$, the conditions of the invention may be satisfied or may not be satisfied if the widths are in a direction in which they become narrow. This is because, if the bottom of the container does not have to be stretched to a sufficient degree, then there arouses no problem despite the vicinity of center of the bottom of the

TABLE 1

| Time for maintaining compression-molding metal mold tightened | Space width of metal mold corresponding to preform thickness (mm) T Temp. (° C.) | | | | Ratio of space widths (body/mouth) | | |
|---|---|---|---|---|---|---|---|
| (sec) | T_30 | T_60 | T_80 | T_120 | T_80/T_60 | T_120/T_60 | T_120/T_30 |
| 4 | — | 1.70 | 1.99 | 2.67 | 1.17 | 1.57 | — |
| 5 | — | 1.82 | 2.13 | 2.87 | 1.17 | 1.58 | — |
| 6 | 1.40 | 1.94 | 2.28 | 3.08 | 1.18 | 1.59 | 2.20 |
| 7 | 1.52 | 2.10 | 2.45 | 3.30 | 1.17 | 1.57 | 2.17 |
| 8 | 1.67 | 2.25 | 2.63 | 3.52 | 1.17 | 1.56 | 2.11 | preform is set to have a relatively small thickness so as to be easily cooled. The same also holds for the connection portion 5k.

Further, the connection portion 5k or 5p may be formed by varying the diameter of the metal mold that forms the outer surface side of the preform.

The connection portion 5k having a tilted portion 5h of the shape of a circular truncated cone may be omitted and, instead, the mouth portion 5a and the body portion 5b may be connected stepwise on the inner surface side (in a manner that the portion 5h becomes horizontal).

The metal mold for compression molding may be the known one, and there is no limitation on the position for splitting or assembling the metal mold or the mechanism thereof provided the cavity (space of metal mold) satisfies the conditions of the present invention.

As for the compression-molding machine and the blow-molding machine, there is no particular limitation on the layout thereof provided the blow molding can be quickly conducted by the blow-molding machine after the preform is compression-molded (passing through a simple temperature-adjusting device that is added as required).

The present invention can be operated not only for molding the preforms, molding the bottles or for running a system for filling the beverages under aseptic conditions but also under the ordinary environment of consecutively compression-molding the preforms through up to molding the bottles.

Industrial Applicability

The system for aseptically filling the containers with beverages and foods of the invention can be favorably applied to filling PET bottles with beverages and sealing them, as well as for filling wide-mouthed containers with foods and sealing them satisfying a requirement of high "aseptic level".

According to the present invention, the preform that is compression-molded and taken out from the metal mold has a high temperature, and can be favorably used for producing a container and for a system for filling the content solutions that are desired to be aseptic.

| | Description of Reference Numerals: |
|---|---|
| A | SYSTEM FOR ASSEPTICALLY FILLING PET BOTTLES WITH BEVERAGES |
| B | PF FEED UNIT |
| C | BOTTLE-PRODUCING UNIT |
| D | FILLING/SEALING UNIT |
| E | CAP-STERILIZING UNIT |
| F | CAP FEED UNIT |
| G | BEVERAGE FEED UNIT |
| H | BEVERAGE HEAT-STERILIZING MACHINE |
| I | CLEAN BOX |
| 2 | EXTRUDING MACHINE |
| 5 | PREFORM |
| 5a | MOUTH PORTION (NOZZLE) |
| 5b | BODY PORTION |
| 5c | BOTTOM PORTION |
| 5f | NAPIFORMED PORTION |
| 5g | NECK RING PORTION |
| 5h | TILTED PORTION |
| 8 | CUTTER WHEEL |
| 31 | COMPRESSION-MOLDING MACHINE |
| 33 | COMPRESSION-MOLDING METAL MOLD |
| 34 | CAVITY METAL MOLD |
| 35 | CORE METAL MOLD |
| 36 | SLIDE INSERT METAL MOD |
| 52 | BLOW-MOLDING MACHINE |
| 54 | WBZ |

The invention claimed is:

1. A system for aseptically filling a container with a beverage or food, comprising a preform feed unit comprising a metal mold for molding a preform from a synthetic resin, a container-producing unit for molding a container from the preform, a filling/sealing unit for filling the container with a beverage or food and sealing the container with a seal member, and a seal member-sterilizing unit for sterilizing said seal member prior to said sealing; wherein said preform is maintained in a high-temperature state where a minimum temperature is not lower than 60° C. on the whole surface of said preform from when said preform is molded from said synthetic resin by compression molding in said preform feed unit and is taken out from the metal mold for compression molding through up to just before it is molded into the container in said container-producing unit, said synthetic resin is a polyethylene terephthalate having a glass transition temperature of 77° C. to 78° C., and said preform has a temperature when it is taken out of not higher than 80° C. on the surface of the mouth portion of the preform.

2. The system for aseptically filling a container with a beverage or food according to claim 1, wherein a female mold and a male mold of said metal mold for molding form a space for compression-molding a mouth portion, a body portion and a bottom portion of said preform, and a space width (t2) of at least the body portion in the space width for forming a thickness of from the body portion to the bottom portion of said preform is set to lie in a range of 1.18 to 2.11 times as great as a space width (t1) for forming a thickness of an upper end portion of the mouth portion of said preform.

3. The system for aseptically filling a container with a beverage or food according to claim 1, wherein a female mold and a male mold of said metal mold for molding form a space for compression-molding a mouth portion, a body portion and a bottom portion of said preform, and a space width (t2) of at least the body portion in the space width for forming a thickness of from the body portion to the bottom portion of said preform is set to lie in a range of 1.18 to 2.11 times as great as a space width (t3) for forming a thickness of from the lower side of a napiformed portion to the upper side of a neck ring portion of the mouth portion of said preform.

4. The system for aseptically filling a container with a beverage or food according to claim 1, wherein the temperature on the surface of the preform of when it is taken out is controlled so as to stay in the high-temperature state by adjusting at least any one of a preform-molding time of from when the metal mold for molding is closed until when it is opened, a temperature at which the synthetic resin is thrown into the metal mold for molding or a temperature for cooling the metal mold for molding.

5. The system for aseptically filling a container with a beverage or food according to claim 1, wherein a compression-molding machine for compression-molding the preform in said preform feed unit, container-producing unit, filling/sealing unit and seal member-sterilizing unit are installed in a clean box, and conveyer passages connecting the units are also installed in the clean box.

6. The system for aseptically filling a container with a beverage or food according to claim 5, wherein the interior of said clean box is controlled to maintain a cleanliness level of not lower than a class 10,000.

7. The system for aseptically filling a container with a beverage or food according to claim 5, wherein the inner surface of said clean box and the outer surfaces of the units installed in said clean box are sterilized.

8. The system for aseptically filling a container with a beverage or food according to claim 5, wherein the interior of said clean box maintains a positive-pressure environment with filtered clean air.

9. The system for aseptically filling a container with a beverage or food according to claim 1, wherein
said container-producing unit and said filling/sealing unit are directly coupled together and are installed in the same clean box.

10. The system for aseptically filling a container with a beverage or food according to claim 9, wherein said container-producing unit and said filling/sealing unit are partitioned from each other by a sterilized partitioning zone, preventing the beverage or food from infiltrating into said container-producing unit.

11. The system for aseptically filling a container with a beverage or food according to claim 1, wherein said synthetic resin is a polyethylene terephthalate, said container is a bottle molded from a compression-molded preform through a blow molding, said seal member is a screw-type cap, and said bottle filled with heat-sterilized beverage is sealed by screwing said screw-type cap.

12. The system for aseptically filling a container with beverage or food of claim 1, further comprising a wet blocking zone arranged between a bottle-producing unit and a filling/sealing unit.

\* \* \* \* \*